(12) United States Patent
Saeed

(10) Patent No.: US 11,071,261 B2
(45) Date of Patent: Jul. 27, 2021

(54) SUBTERRANEAN IRRIGATION SYSTEM

(71) Applicant: ELEMENTAL ENGINEERING AG, Baar (CH)

(72) Inventor: Osman Saeed, Baar (CH)

(73) Assignee: ELEMENTAL ENGINEERING AG, Baar (CH)

( * ) Notice: Subject to any disclaimer, the term of this patent is extended or adjusted under 35 U.S.C. 154(b) by 0 days.

(21) Appl. No.: 16/634,378

(22) PCT Filed: Jul. 27, 2018

(86) PCT No.: PCT/CH2018/000034
§ 371 (c)(1),
(2) Date: Jan. 27, 2020

(87) PCT Pub. No.: WO2019/023813
PCT Pub. Date: Feb. 7, 2019

(65) Prior Publication Data
US 2021/0112737 A1    Apr. 22, 2021

(30) Foreign Application Priority Data
Aug. 4, 2017  (EP) ..................................... 17184984

(51) Int. Cl.
*A01G 25/00*   (2006.01)
*A01G 25/06*   (2006.01)
(Continued)

(52) U.S. Cl.
CPC .............. *A01G 25/06* (2013.01); *A01G 25/02* (2013.01); *E02B 11/005* (2013.01)

(58) Field of Classification Search
CPC ........ A01G 25/06; A01G 25/02; A01G 25/00; A01G 25/16; E02B 11/005
See application file for complete search history.

(56) References Cited

U.S. PATENT DOCUMENTS 2,798,768 A * 7/1957 Babin .................... A01G 25/02
                                                           239/145
2,803,948 A * 8/1957 Dorfman ................. C02F 3/046
                                                           405/46
(Continued)

FOREIGN PATENT DOCUMENTS

AU       2016 100 549 A4    6/2016
SU         1 644 823 A1     4/1991

OTHER PUBLICATIONS

International Search Report for PCT/CH2018/000034 dated Nov. 13, 2018 [PCT/ISA/210].

*Primary Examiner* — Benjamin F Fiorello
(74) *Attorney, Agent, or Firm* — Sughrue Mion, PLLC

(57) ABSTRACT

A subterranean irrigation system (100) has a plurality of fluid conduit (130) for applying a liquid from a source to an area of ground, to which said liquid is to applied while avoiding interference with the above-ground use of such area, wherein the fluid conduits (130) are connected (140; 500) relative to one another and wherein the plurality of fluid conduits (130) comprise a plurality of outlets to effect the distribution of the liquid to the ground area, wherein the plurality of outlets (600;621, 622, 623; 800; 821, 822, 823) are provided at an underside (602, 802) of a nose-shaped spout attachment (600, 800), wherein the spout attachment (600; 800) is attached at the side in the upper half of the fluid conduit (130; 230; 720) and wherein the underside (602; 802) comprises a rounded surface starting tangentially from the outer diameter of the fluid conduit (130; 230; 720) and ends in the nose-shaped free end of the spout attachment (600; 800).

15 Claims, 32 Drawing Sheets

(51) Int. Cl.
*A01G 25/02* (2006.01)
*E02B 11/00* (2006.01)

(56) References Cited

U.S. PATENT DOCUMENTS

| | | | | |
|---|---|---|---|---|
| 3,588,012 A | * | 6/1971 | Schaefer | A01G 25/02 |
| | | | | 248/80 |
| 3,762,170 A | * | 10/1973 | Fitzhugh | A01G 25/023 |
| | | | | 405/38 |
| 3,903,929 A | * | 9/1975 | Mock | F16L 11/121 |
| | | | | 138/115 |
| 3,966,233 A | * | 6/1976 | Diggs | A01G 25/023 |
| | | | | 405/48 |
| 4,061,272 A | * | 12/1977 | Winston | A01G 25/06 |
| | | | | 405/45 |
| 4,065,926 A | | 1/1978 | Brandt | |
| 4,162,041 A | * | 7/1979 | Hane | A01G 25/02 |
| | | | | 239/266 |
| 5,374,138 A | | 12/1994 | Byles | |
| 5,755,383 A | * | 5/1998 | Joseph | A01G 9/28 |
| | | | | 239/276 |
| 5,785,454 A | | 7/1998 | Ringdal et al. | |
| 5,960,827 A | * | 10/1999 | Rosenberg | A01G 25/02 |
| | | | | 137/561 A |
| 6,619,565 B1 | * | 9/2003 | Abbott | A01G 25/02 |
| | | | | 239/273 |
| 2001/0042813 A1 | * | 11/2001 | Taylor | A01G 25/02 |
| | | | | 248/75 |
| 2007/0194149 A1 | * | 8/2007 | Mavrakis | A01G 25/06 |
| | | | | 239/542 |
| 2008/0210785 A1 | * | 9/2008 | Hou | A01G 25/06 |
| | | | | 239/542 |
| 2008/0251291 A1 | | 10/2008 | Kadrnoska et al. | |
| 2010/0260547 A1 | * | 10/2010 | Niemczyk | E02B 11/005 |
| | | | | 405/39 |
| 2013/0272791 A1 | * | 10/2013 | Bayley | A01G 25/02 |
| | | | | 405/37 |
| 2016/0066519 A1 | * | 3/2016 | Jansen | A01G 25/02 |
| | | | | 47/79 |
| 2018/0014479 A1 | * | 1/2018 | Cohen | B29C 66/4322 |

* cited by examiner

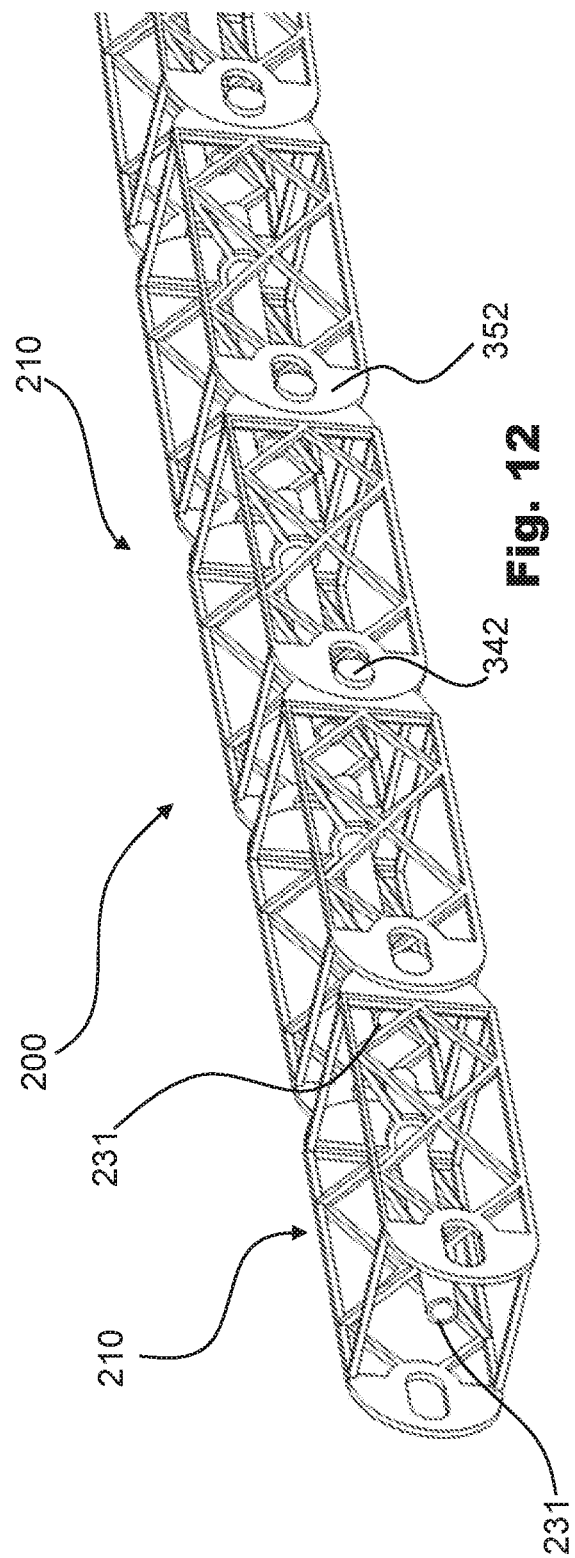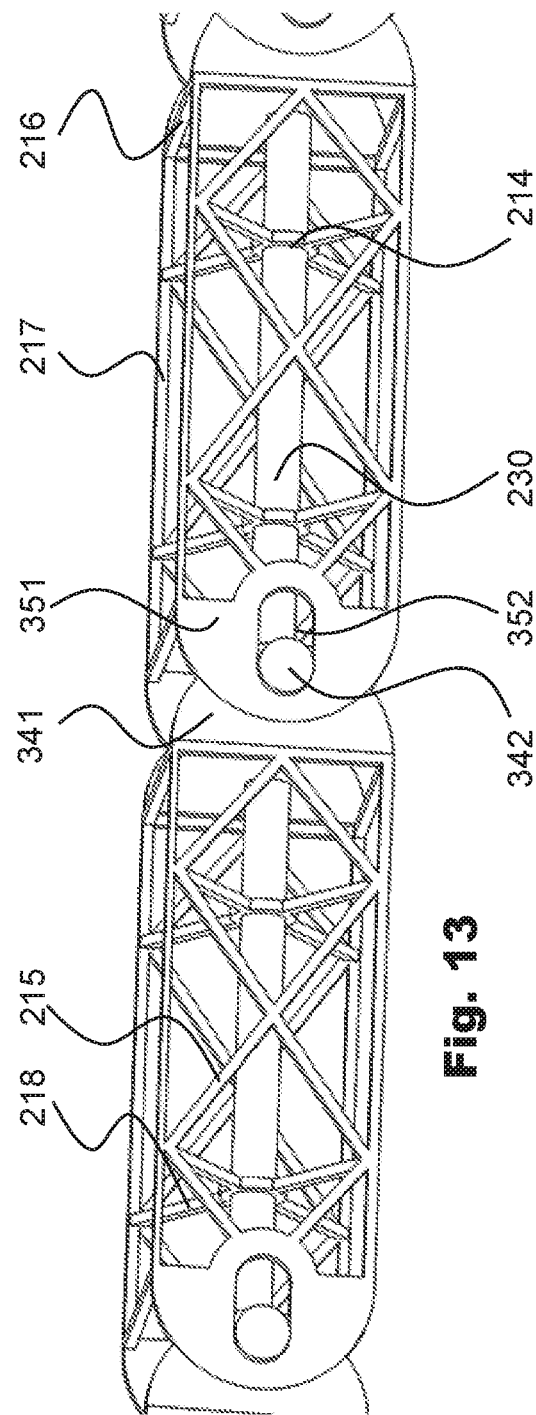
Fig. 12
Fig. 13

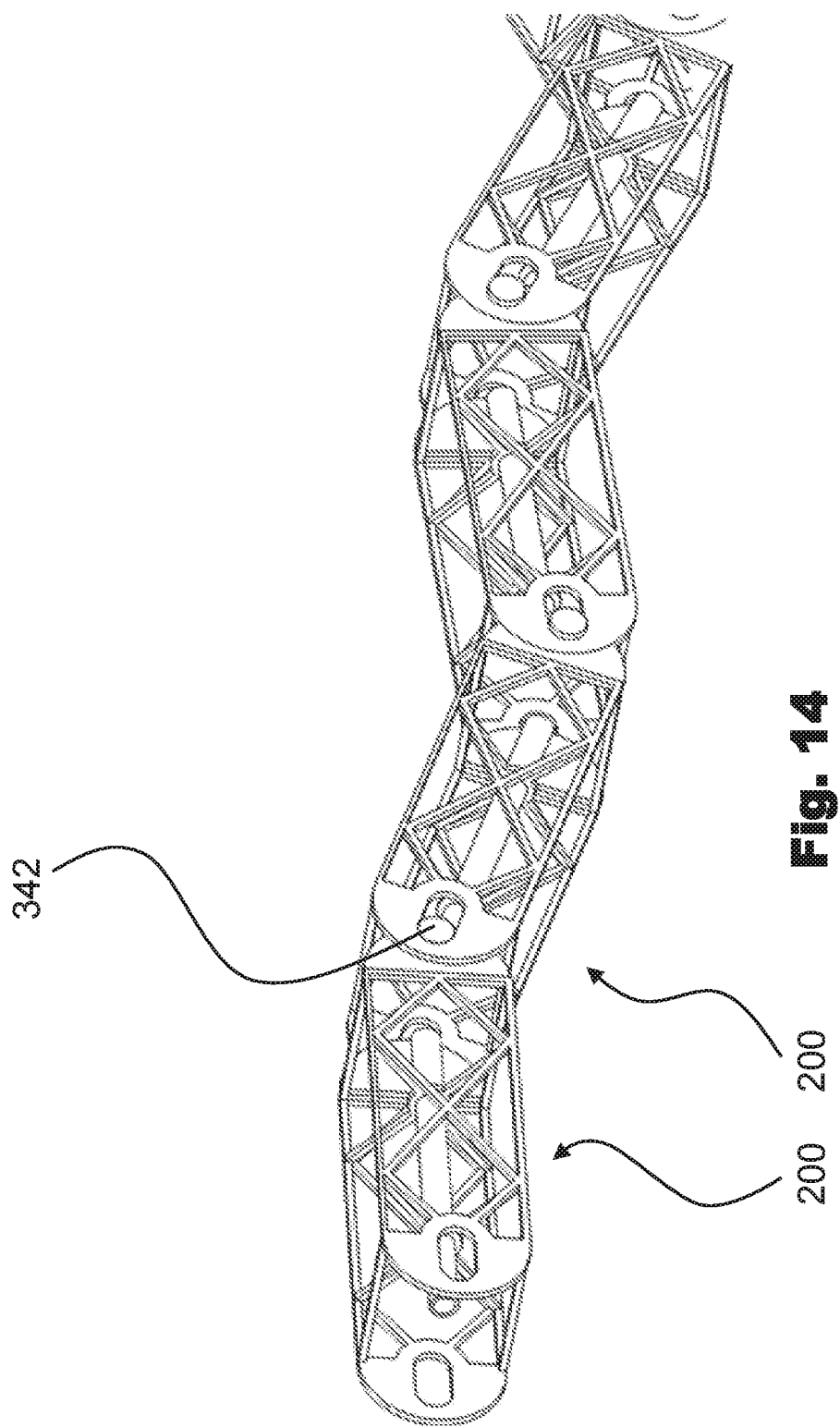

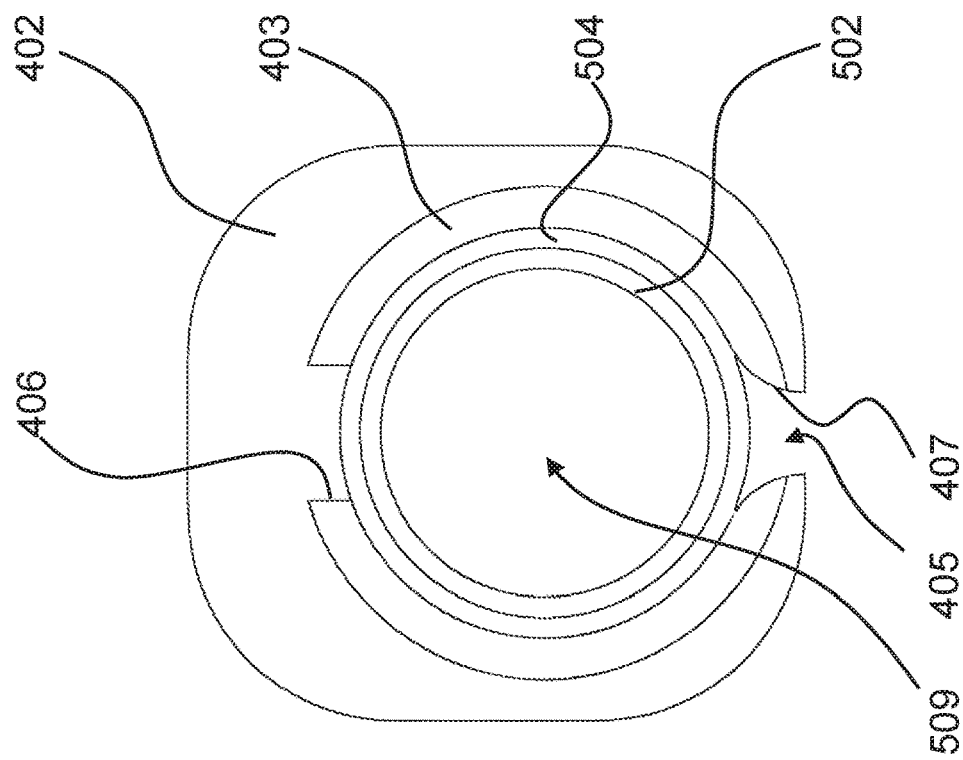
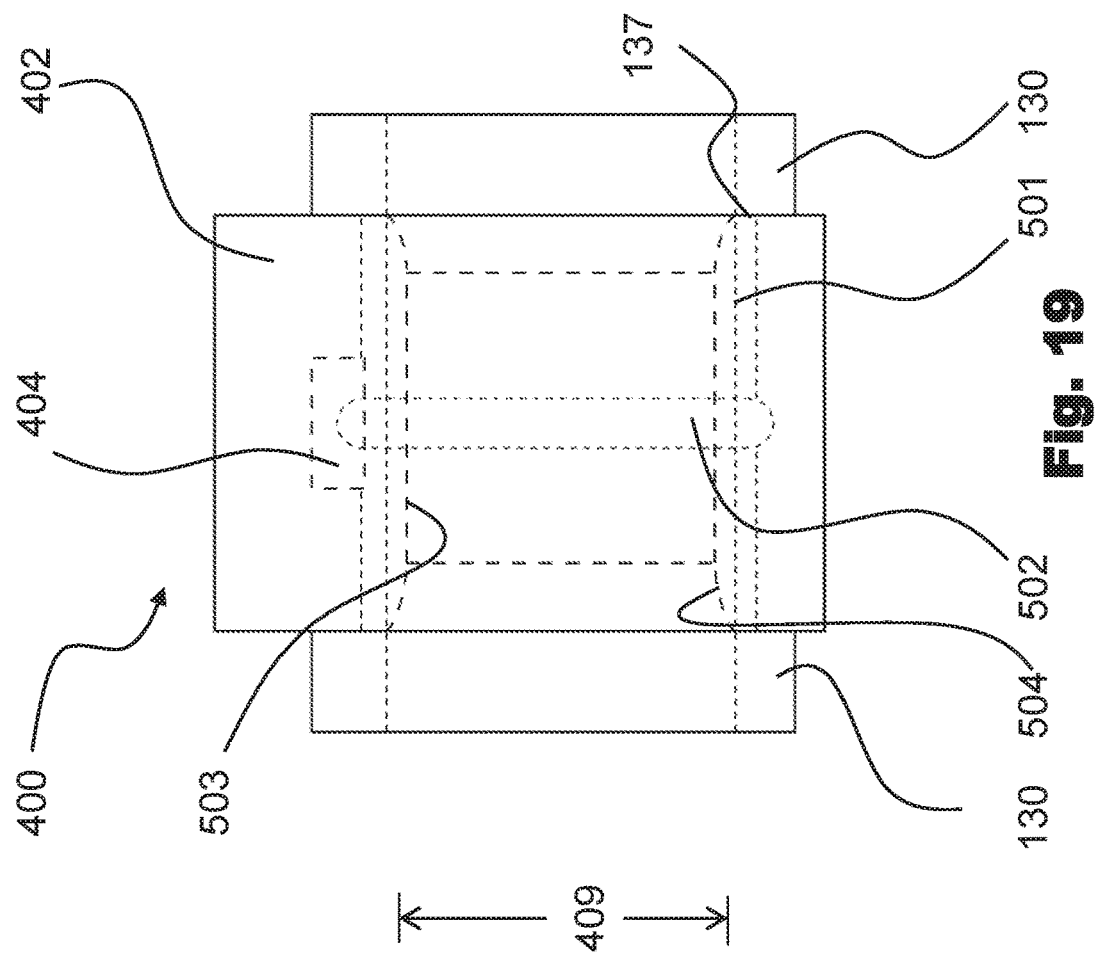

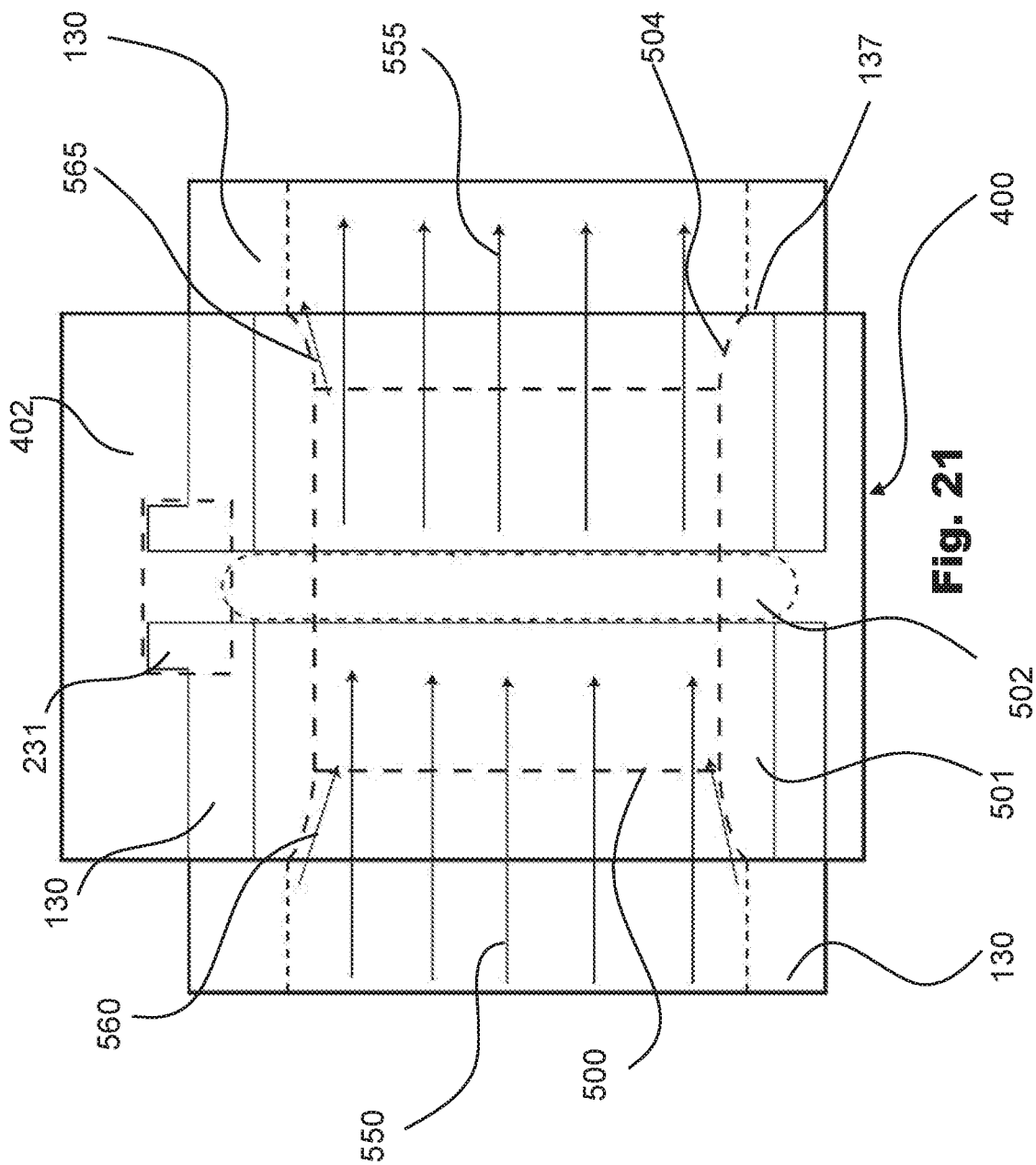

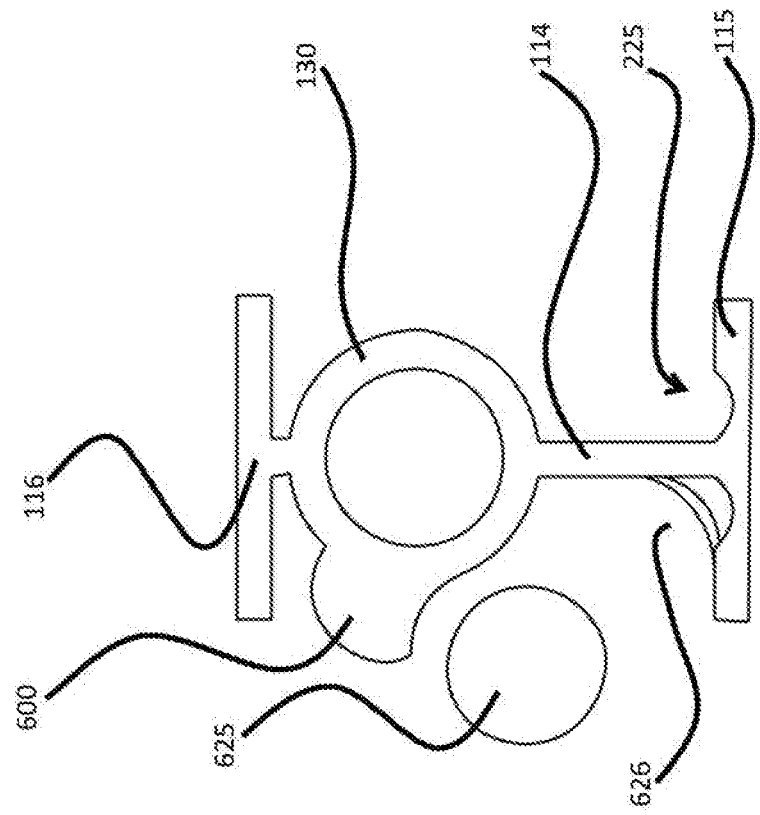
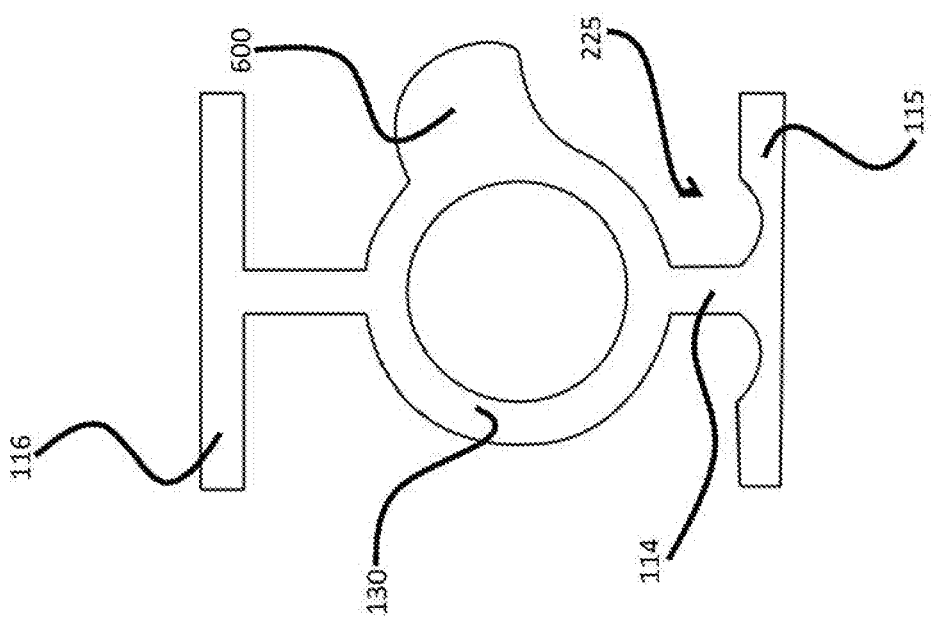

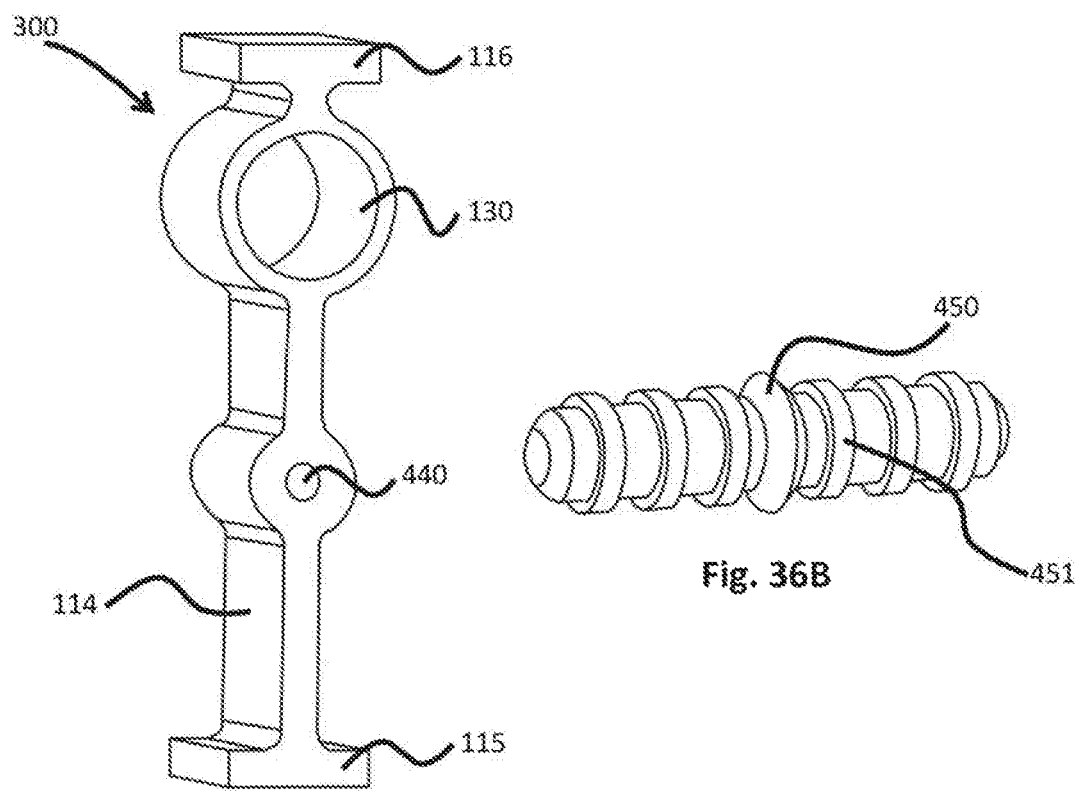
Fig. 36A
Fig. 36B
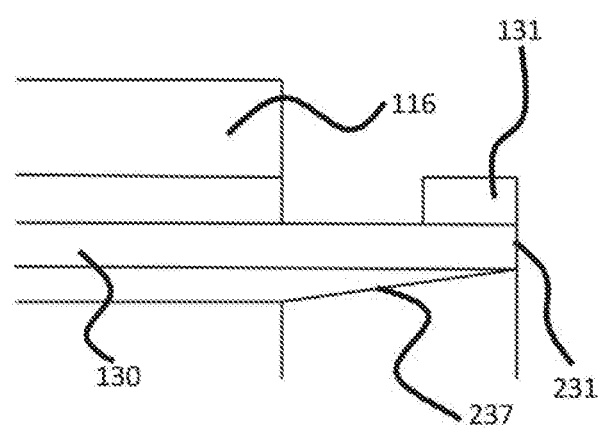
Fig. 37

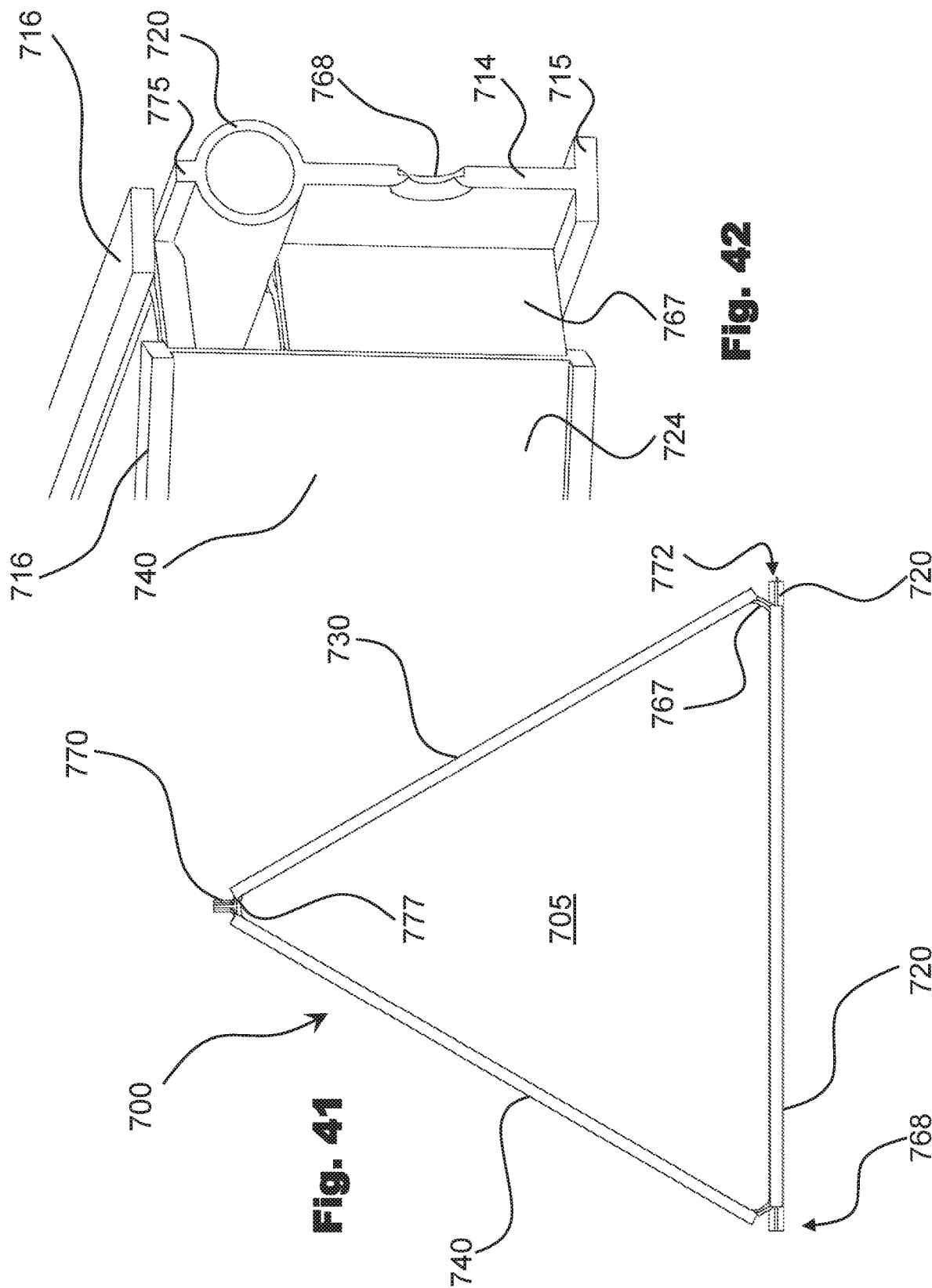

SUBTERRANEAN IRRIGATION SYSTEM

CROSS REFERENCE TO RELATED APPLICATIONS

This application is a National Stage of International Application No. PCT/CH2018/000034 filed Jul. 27, 2018, claiming priority based on European Patent Application No. 17184984.7 filed Aug. 4, 2017.

TECHNICAL FIELD

The present invention relates to a subterranean irrigation system, having a plurality of fluid conduits for applying a liquid from a source to an area of ground, to which said liquid is applied while avoiding interference with the above-ground use of such area, wherein the fluid conduits are connected relative to one another, wherein this plurality of fluid conduits comprise a plurality of outlets to effect the distribution of the liquid to the ground area.

PRIOR ART

Such a subterranean irrigation system is known form U.S. Pat. No. 4,065,926, wherein two sandwiched sheets of plastic are periodically sealed together to form a resulted grid pattern of non-sealed interconnected passages, forming an area of a plurality of flow passages, wherein in between the sheet is interrupted in order to allow access to the ground.

SUMMARY OF THE INVENTION

Based on this prior art it is an object of the present invention to improve the distribution of fluid in a subterranean irrigation system, which is more flexible than the prior art.

It is a further object of the invention to reduce the distribution amount of necessary liquids delivered by the irrigation system by virtue of the fluid conduits.

A subterranean irrigation system having a plurality of fluid conduit for applying a liquid from a source to an area of ground, to which said liquid is to applied while avoiding interference with the above-ground use of such area, wherein the fluid conduits are connected relative to one another, wherein the plurality of fluid conduits comprise a plurality of outlets to effect the distribution of the liquid to the ground area, the plurality of outlets are provided at an underside of a nose-shaped spout attachment, wherein the spout attachment is attached at the side in the upper half of the fluid conduit. This protects the openings against clogging from above and shields the water outlet.

Further, the underside of the spout comprises a rounded surface starting tangentially from the outer diameter of the fluid conduit and ending in the nose-shaped free end of the spout attachment, providing in a cross-section a circle shaped distribution area for the fluid to be distributed through the openings in the spout nose.

The subterranean irrigation system can also have a fluid conduit positioned inside a web-based framework, wherein the framework comprises hinge connectors at both longitudinal free ends. Such a web comprising structure allows to bring the water conduit at the place where it is intended to be used with the possibility to change the direction of the grid. The fluid conduit is maintained through transverse webs in a central position of the frame and is such protected against outer forces.

The subterranean irrigation system can comprise fluid conduits which are positioned on the longitudinal edge of a plate-shaped conduit support structure. Such a plate-shaped conduit support structure provide different functions to the irrigation unit. It confers stability to the grid of the irrigation system, independent from the grid lay out. Then it is possible to build above ground structures without interfering with a compacted soil beneath.

Furthermore the structure provided below the fluid conduit allow water distribution to be retained in the soil, since the grid provides a compartment structure for water.

The conduit support structure can have a cover plate with a top surface, preferably having a width corresponding to the outer diameter of the fluid conduit it covers. Thus it is possible to protect the fluid conduit against pressure from above and the top surface can be used as starting point for any structure to be built above ground.

Such a system can comprise a plurality of parallel positioned fluid conduits and a plurality of further plate-shaped support structures positioned in an angle to the conduit support structure forming a grid with intersection points, wherein the angle is chosen from the group of 60, 90 or 120 degree, forming a rectangular grid, a triangular grid and a hexagonal grid, respectively. It can also be any further grid structure building up the 2D surface of the soil. The intersection points can be used to provide additional connections between different fluid conduits but the fluid conduits can also be maintained in parallel orientation and position.

In a different embodiment of the irrigation system the plate-shaped conduit support structure can be connected with a cover plate through conduit holding rings. Then, the fluid conduits are pipes positioned as separate elements through the conduit holding rings and preferably over a number of subterranean irrigation system elements. This facilitates the tightness of the fluid conduit system through the fact that long pipes are to be added along an entire fluid conduit line after or while adding different irrigation system elements to a grid.

It is preferred that complementary locking profiles are provided at every free end of the plate-shaped conduit support structure of the fluid conduits and at every free end of the further plate-shaped support structures to build up a grid with fixed connections so that even if the soil would tend to move the grid remains stable and a unit, since limiting barriers on the sides of the structure provide added retention points to support rigidity of the soil from creep.

The fluid conduits of adjacent subterranean irrigation system elements can be connected via a connector positioned on the free ends of the fluid conduits. This allows a fixed connection between adjacent fluid conduits improving the tightness of the pipe system. Additionally providing the connector with an inner recess and that the fluid conduit with a nose at its free end to be fitted inside the recess maintains the connection against tensile forces acting into the longitudinal direction of the fluid conduit.

Additionally the connector can comprise a gasket insert. Such gasket made in more resilient polymer provides a tightening function. Preferably, the inner lumen of the free end of the fluid conduits are tapered towards the mouth, thus opening the diameter towards the free end. Then a correctly dimensioned cylindrical gasket can easily be entered into the fluid conduit but cannot be lost in the fluid conduit since the gasket outer diameter is larger than the main inner diameter of the fluid conduit. The gasket preferably has a central outer bulge which remains positioned between the adjacent fluid conduits providing an additional seal, especially in view of the encompassing connector.

The fluid is spent through openings in the fluid conduits. The distribution of openings in the conduits depend on the amount of fluid to be spent which can be quite different in different settings. In a grid system, there is at least one outlet for every grid space element. The plurality of outlets can be provided as simple holes on the sides of the fluid conduits. There can be two holes provided at opposite sides of the fluid conduit between two transverse arranged further plate-shaped support structures. The holes can be oriented horizontally or they can be oriented especially in a downward oriented angle as e.g. 30 or 45 degrees. Then the fluid will be distributed near the vertical wall of the grid structure maintaining a fluid reservoir at that place.

The vertical wall can comprise a broadened foot, especially a T-shaped foot providing a shoulder extending sidewards from the vertical wall, hindering a fluid volume to easily enter deeper in the ground. It is also possible to provide a longitudinal groove along this L-shaped (in a cross-section view for only one side) corner to provide a liquid or humidity retention groove.

The free end of the underside of the spout can be oriented horizontally or slightly curved downwards to enhance the effect.

Each spout attachment can comprise three outlets, a central outlet and two side outlets positioned farer away from the free end of the nose attachment than the central outlet. This enhances the security of fluid distribution if clogging could arise. Each outlet can comprise an internal pipe in the nose attachment converging to a single inner mouth of the spout, wherein the inner mouth is positioned in the upper half of the lumen of the fluid conduit.

The conduit support structure can comprise a broadened base, preferably provided with a water retention groove (225).

The sideways extending spout can provide a media deposition area just below the spout for fluid being delivered through spout and to be further retained in the groove.

A spout for such a system is configured to be attached at the side in the upper half of the fluid conduit.

Further embodiments of the invention are laid down in the dependent claims.

This ground structure has been designed, according to one embodiment, specifically to support and act as a foundation for a device as shown in FIG. 13 in PCT/EP2017/056848 or a device as shown in EP 17 155 433.0, both filed for the applicant of the present application, and through the principle of added volume of soil and adding hydration to the soil, the ground can be subjected to greater loads without creep and/or erosion.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

FIG. 12 shows a schematic perspective view on five irrigation system elements of FIG. 11 when joining two associated longitudinal frame elements one after the other;

FIG. 13 shows a schematic perspective detail view of FIG. 12;

FIG. 14 shows a schematic perspective view of the five elements as arranged in FIG. 12 with a transverse offset between each pair of the irrigation system elements;

FIG. 19 shows a schematic perspective side view of the connector, wherein some broken lines show a gasket from FIG. 28 as positioned inside of the connector;

FIG. 20 shows a schematic front view on the connector with an inserted gasket;

FIG. 21 shows a section side view of the connector from FIG. 19 with an inserted gasket from FIG. 28, wherein arrows are reflecting the fluid flow through the connector;

FIG. 35A shows a schematic cross section view through the very short wall of an irrigation system element similar to FIG. 1 and with a spout according to FIG. 29;

FIG. 35B shows a schematic cross section view through the longer wall of an irrigation system element similar to FIG. 1 with a water retention groove and with a spout according to FIG. 29;

FIG. 36A shows a schematic partly perspective view of an irrigation system according to an embodiment of the invention with a modified connector element in the wall;

FIG. 36B shows a connector for connecting the irrigation system elements of FIGS. 36A and 36B;

FIG. 37 shows a schematic detail side view on the front portion of a fluid conduit similar to FIG. 27;

FIG. 41 shows a schematic view from above of a further embodiment of one element of an irrigation system with a triangular arrangement;

FIG. 42 shows a schematic perspective view of a corner of the irrigation system element of FIG. 41 with a fluid conduit;

DESCRIPTION OF PREFERRED EMBODIMENTS

Figure 1:
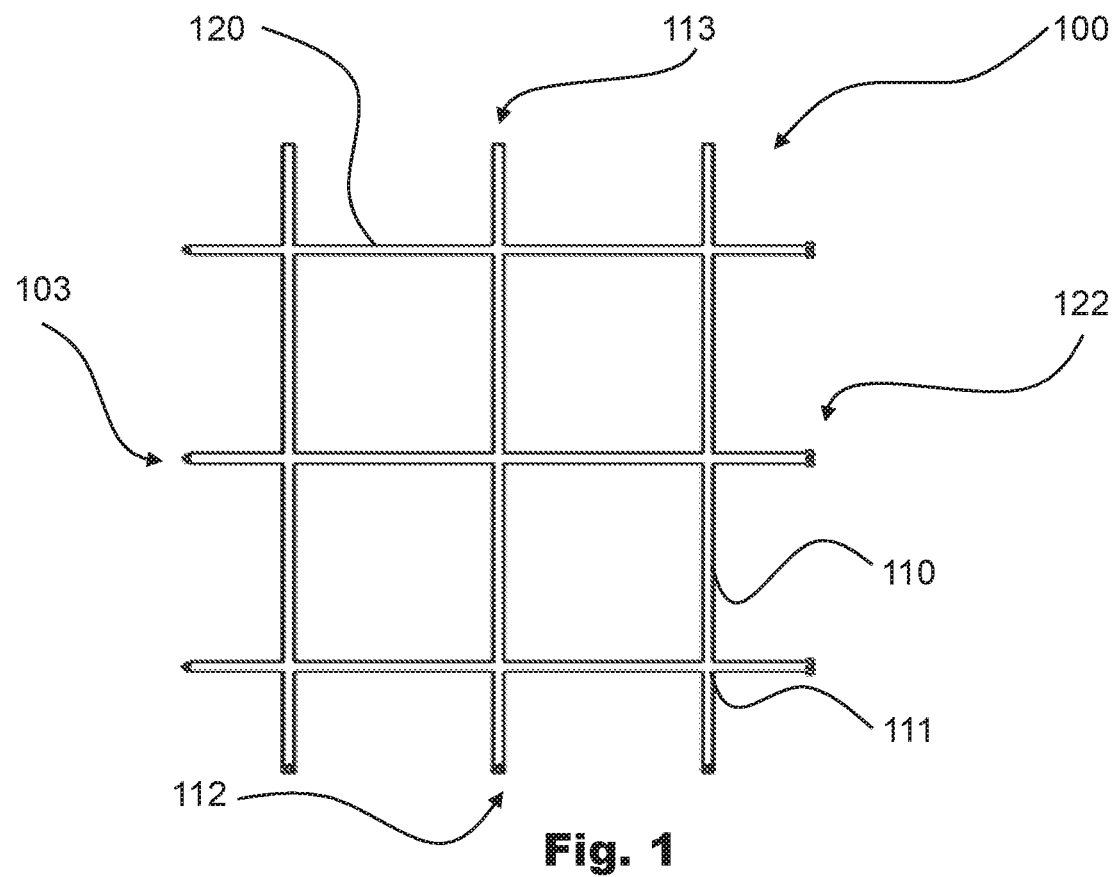
FIG. 1 shows a schematic view from above on an irrigation system element according to a first embodiment of the invention.

FIG. 1 shows a schematic view from above on an irrigation system element 100 according to a first embodiment of the invention. The irrigation system element 100 comprises three longitudinal frame elements 110 comprising a fluid conduit 130 (not visible in FIG. 1) and three transverse frame elements 120. The frame elements are all provided in parallel in an equal distance one from the other and are crossing each other at right angles, forming nine intersection points 111. Each frame element 110 and 120 has two opposite free ends 112 and 113 or 122 and 123, respectively. The opposite free ends 112 and 113 are configured with complementary connectors to each other providing an interlock system with groove and tongue to be used to create a grid with repeating structures based on elements 100 as shown in FIG. 1. The same applies for the free ends 122 and 123. Preferably the connectors are different for the longitudinal and for the transverse frames to ensure creating functional grids connecting the fluid conduits 130 one with another. In case that in a different embodiment the transverse frame elements 120 also comprise fluid conduits 130, then the connectors can be identical.

In all cases, the length of the free ends 112 and 113 are predetermined to allow such a regular connection.

Figure 2:
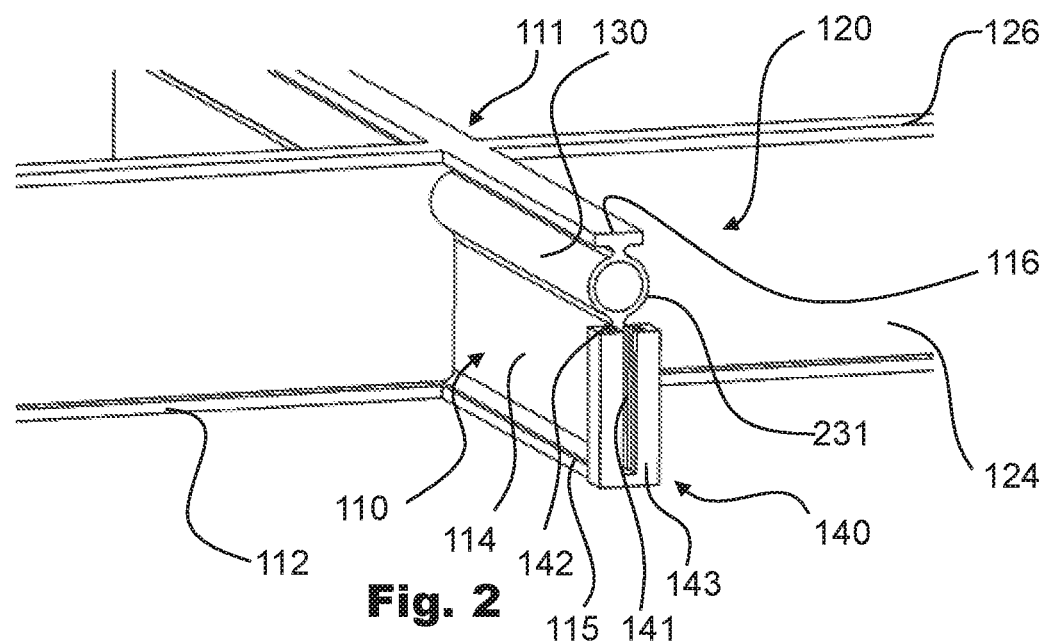
FIG. 2 shows a schematic perspective view of a detail of FIG. 1 relating to a fluid conduit.

FIG. 2 shows a schematic perspective view of a detail of FIG. 1 relating to a fluid conduit 130. The longitudinal frame element 110 comprises a vertical wall 114 with a broadened base 115, here shown to have a trapezoidal cross section and having a width essentially equivalent to the outer diameter of the conduit 130, which conduit 130 is attached in one piece at the top of vertical wall 114. The cylindrical conduit 130 is covered by a T-shaped cover plate 116 directly attached in one piece at the top of the conduit 130.

The transverse frame element 120 comprises a similar broadened base 125 and a similar T-shaped cover plate 126, but does not have a fluid conduit 130 under the cover plate 126 at the top end of the vertical wall 124. In a further embodiment it is possible that the walls 114 and/or 124 are provided in a light-weight embodiment comprising only webs within a mesh between the top- and bottom ends 115 and 116 or 125 and 126, respectively.

Figure 29:
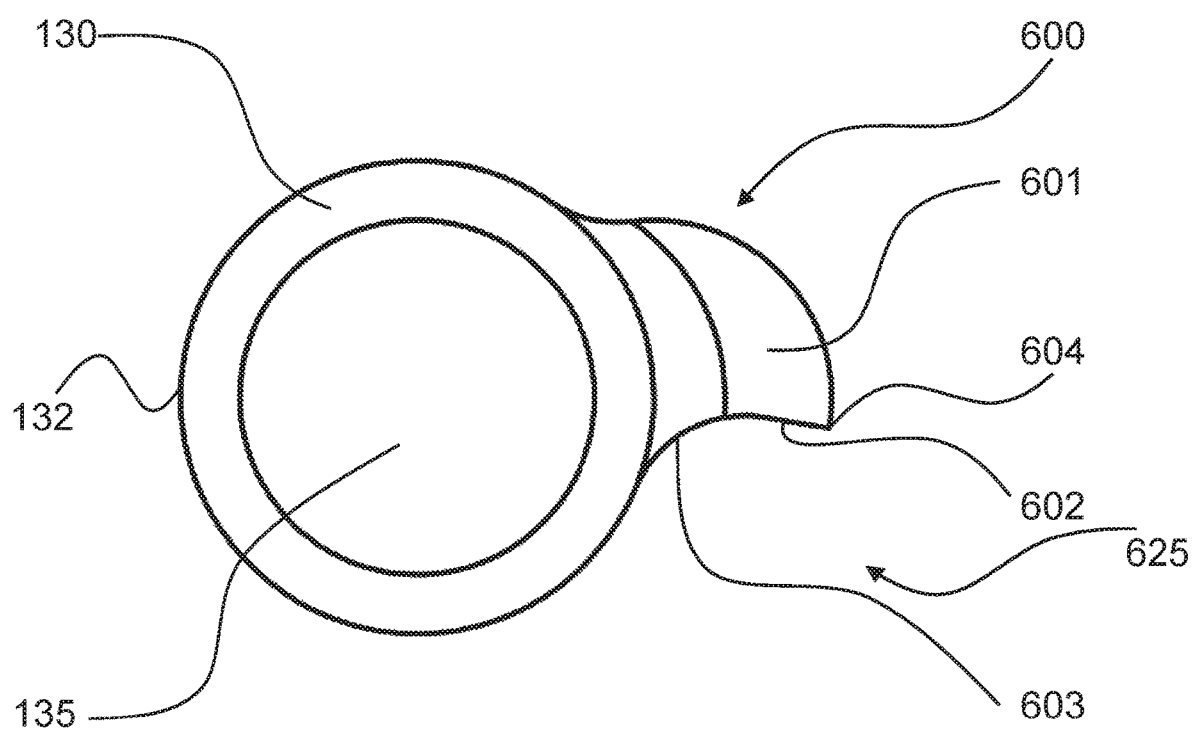
FIG. 29 shows a schematic side view of a spout attached to the fluid conduit according to any of the embodiments of the fluid system element.

An embodiment of the broadened lower base 115 and 125 and a water retention groove 225 is shown in greater detail in FIG. 35B in connection with a spout 600 of FIG. 29. The description relating to the different drawings is provided in their numerical order.

Although it is preferred to provide the top- and bottom ends 125 and 126 (or 115 and 116) being broader or having at least the outer diameter of the fluid conduit, it is also possible to just provide the vertical walls 124 (or 114) as plates, although for stability reasons, the T-shaped bottom is preferred.

At the crossing points 111, the vertical wall 124 of the transverse frame element 120 comprises a through bore allowing the fluid conduit 130 to pass. At and especially below the mouth 231 of the fluid conduit 130 are attached the elements of the interlocking system.

The interlocking system according to the present embodiment comprises an additional profile 140 attached in one piece at the front free end of the wall 114 and extending below the mouth 231 to the bottom of the broadened base 115. The additional locking profile comprises a vertically oriented groove 141 inside a rectangular block, wherein the groove 141 has undercuts 142 on both sides. The groove 141 being mainly oriented in the direction of the vertical wall 114 has an abutment socle 143 at its lower end, allowing for mounting a complementary locking element 150 from above as will be described in connection with the following drawings.

The height of the wall portions 114 and 124 can be smaller than shown in FIG. 2 with the proviso that the interlocking system has to be adapted for a smaller fit. It is possible to only rely on the nose 131—recess 404 combination for connecting the irrigation system elements 100 with the connector 400 as described below in connection with inter alia FIG. 27. Then two noses 131 of adjacent different irrigation system elements are entering one recess 404 of a connector 400 and are thus connected against tensile forces in the longitudinal direction of the fluid conduits 130.

Figure 3:
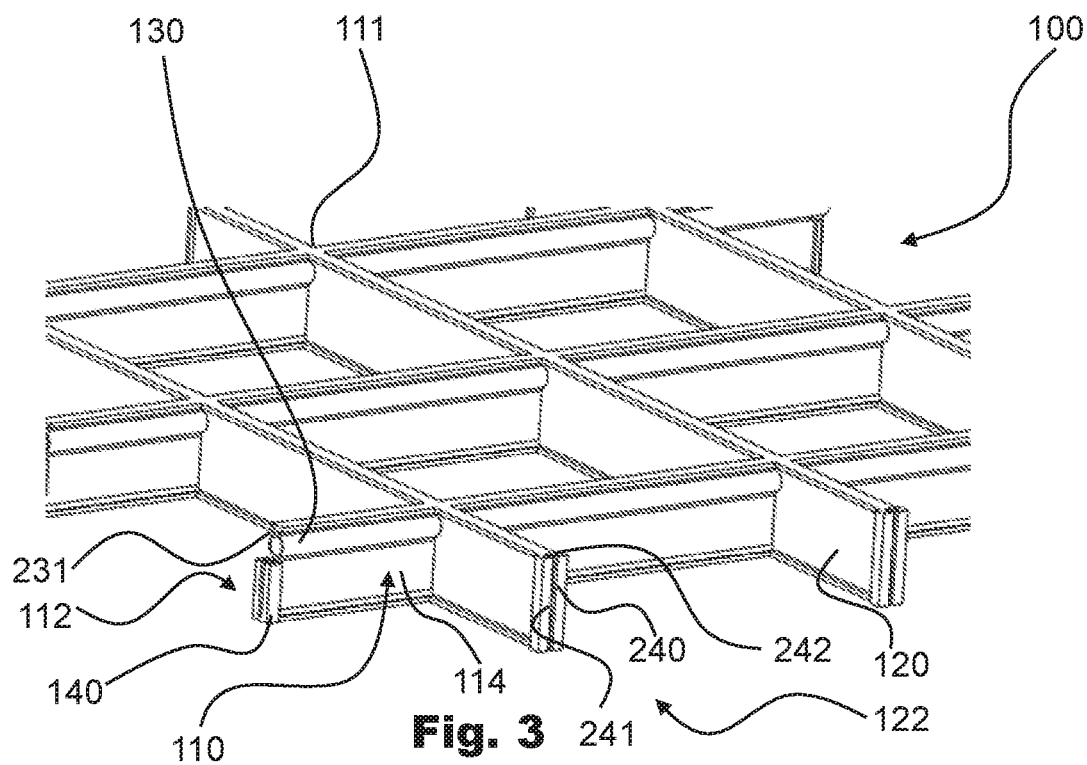
FIG. 3 shows a schematic perspective view of FIG. 1.
Figure 4:
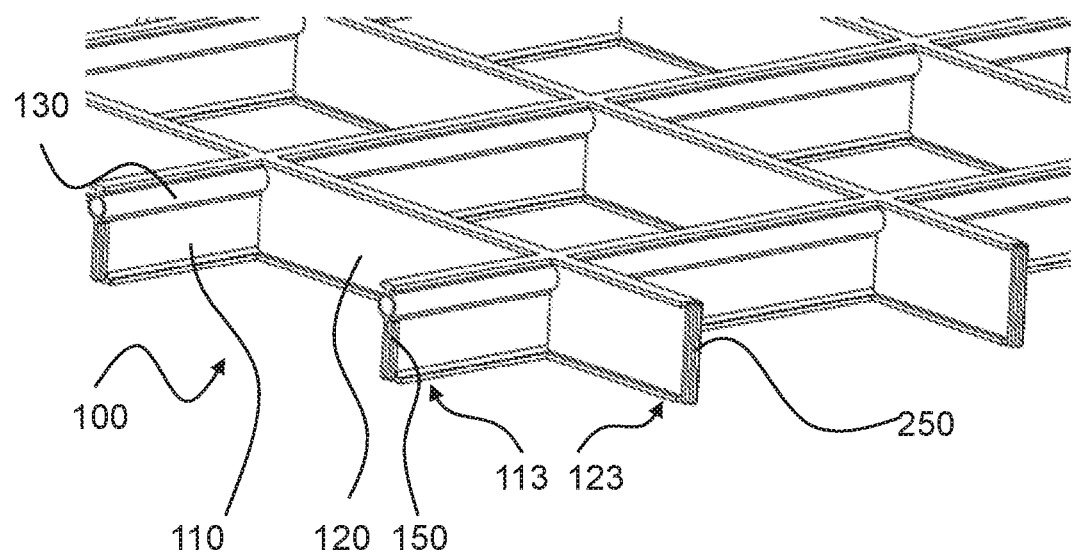
FIG. 4 shows a schematic perspective view of FIG. 1 from a different side compared to FIG. 3.

FIG. 3 shows a schematic perspective view of FIG. 1 and FIG. 4 shows a schematic perspective view of FIG. 1 from a different side compared to FIG. 3 to demonstrate the complementary locking profiles 140 and 150 as well as 240 and 250, respectively, providing the interlocking system.

The first free end 112 of the longitudinal frame element 110 shows the locking profile 140 extending in front of the vertical wall 114 and in front of the mouth 231 of the fluid conduit 130. It can also be seen that the fluid conduit 130 traverses the transverse frame elements 120 in their wall portion 124.

At the free end 122 of the transverse frame element 120 is provided a similar locking profile 240, being a rectangular block with a central groove 241 and side undercuts 242. The difference to the locking profile 140 is in the fact that no socle 143 is provided since there is no need to have an abutment for a precise positioning of one fluid conduit 130 in front of another fluid conduit 130.

Reverting to FIG. 4, the irrigation system element 100 is rotated by 180° around its vertical axis, compared to FIG. 3, and now shows the free ends 113 and 123, opposite to those shown in FIG. 3, providing the complementary locking profiles 150 and 250, respectively.

Locking element 150 comprises, seen from below, a cross-shaped profile complementary to be entered in the groove 141 and the side undercuts 142 forming a cross-shaped recess as seen from above. The front surface of the complementary locking profile 150 is flush with the mouth 231 of the fluid conduit 130 as well as with the front surface of the cover plate 116, allowing to enter these elements from above in the locking profile 140 as shown in FIG. 4. On the other side, the complementary locking profile 250 comprises the cross-shaped extension in prolongation of the transverse frame element 120 along the full length from the cover plate 126 to the broadened base 125.

Figure 5:
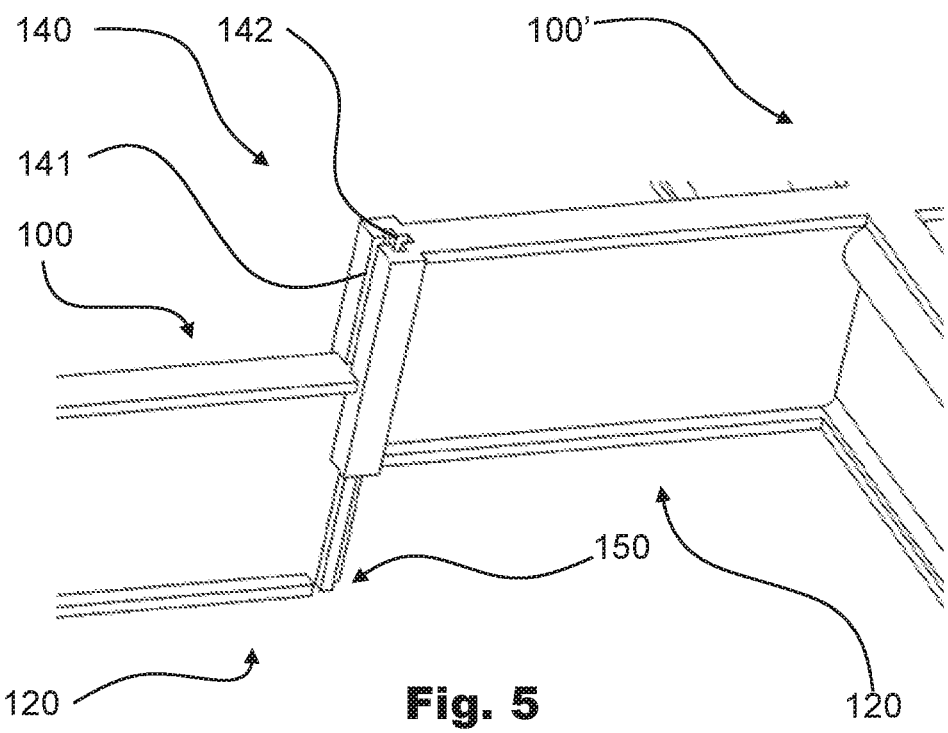
FIG. 5 shows a schematic perspective detail view on two irrigation system elements of FIG. 1 when joining two associated transverse frame elements.

FIG. 5 shows a schematic perspective detail view on two irrigation system elements 100 and 100', wherein the cross-shaped locking profile 150 connects with the locking profile 140. It can be seen, that the undercuts 142 are provided within the middle of the depth of the groove 141, so that in a view from above the groove portion of the locking profile 140 has a cross-shaped recess.

Figure 6:
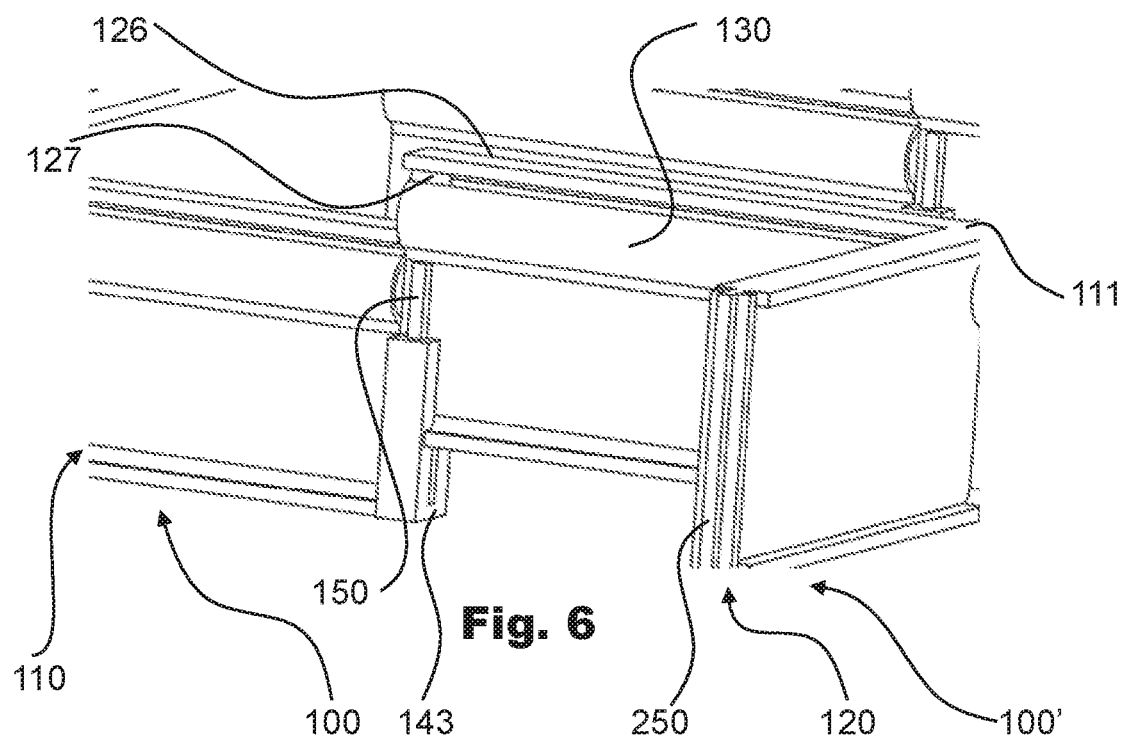
FIG. 6 shows a schematic perspective detail view on two irrigation system elements of FIG. 1 when joining two associated longitudinal frame elements.

FIG. 6 shows a schematic perspective detail view on two irrigation system elements 100 and 100' of FIG. 1 when joining two associated longitudinal frame elements 110. It can be seen, that the complementary locking profile 150 is inserted in the locking profile 140 and will finally abut on the socle 143. Furthermore, it can be seen that in the specific embodiment of FIG. 6, the cover plate 126 is only attached in its front portion with vertically oriented web 127 with the fluid conduit 130 and is only connected with the remaining irrigation system element 100, when crossing the transverse frame element 120 at the intersection point 111.

FIG. 6 also shows the cross-shaped complementary locking profile 250, intended to be connected with another transverse frame element 120 of a further irrigation system element not shown in this drawing.

Figure 7:
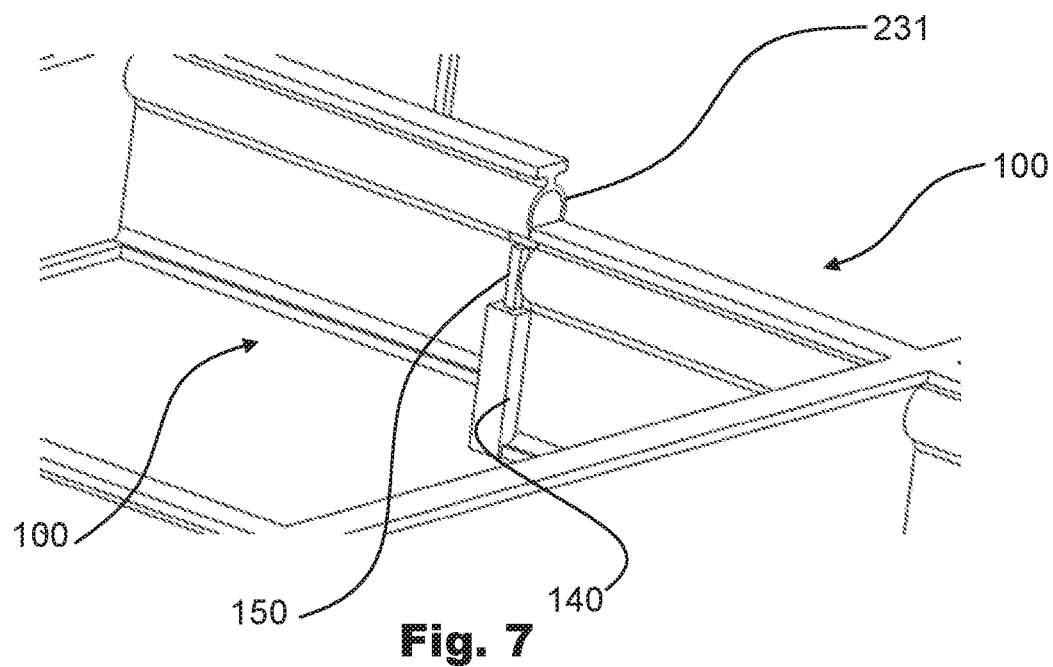
FIG. 7 shows a further schematic perspective detail view similar to FIG. 6.

FIG. 7 shows a further schematic perspective detail view, similar to FIG. 6, where it is clear that the two free ends of the conduit 130 with its mouth 231 are one in front of the other, when the complementary locking profile 150 is inserted in the locking profile 140. It is possible that fluid is leaking at said surface but the main outlet of the fluid will be provided through spouts 600, which are not shown in FIGS. 1 to 13 for simplification reasons of the presentation of the grid itself. It is possible to provide such openings and spouts 600 as simple holes, e.g. two on each conduit portion between each transverse frame element 120, provided with ⅓ of the distance between one transverse frame element 120 and a first of the two spouts 600 and once in each free end 112 and 113 of the longitudinal frame elements 110.

Figure 8:
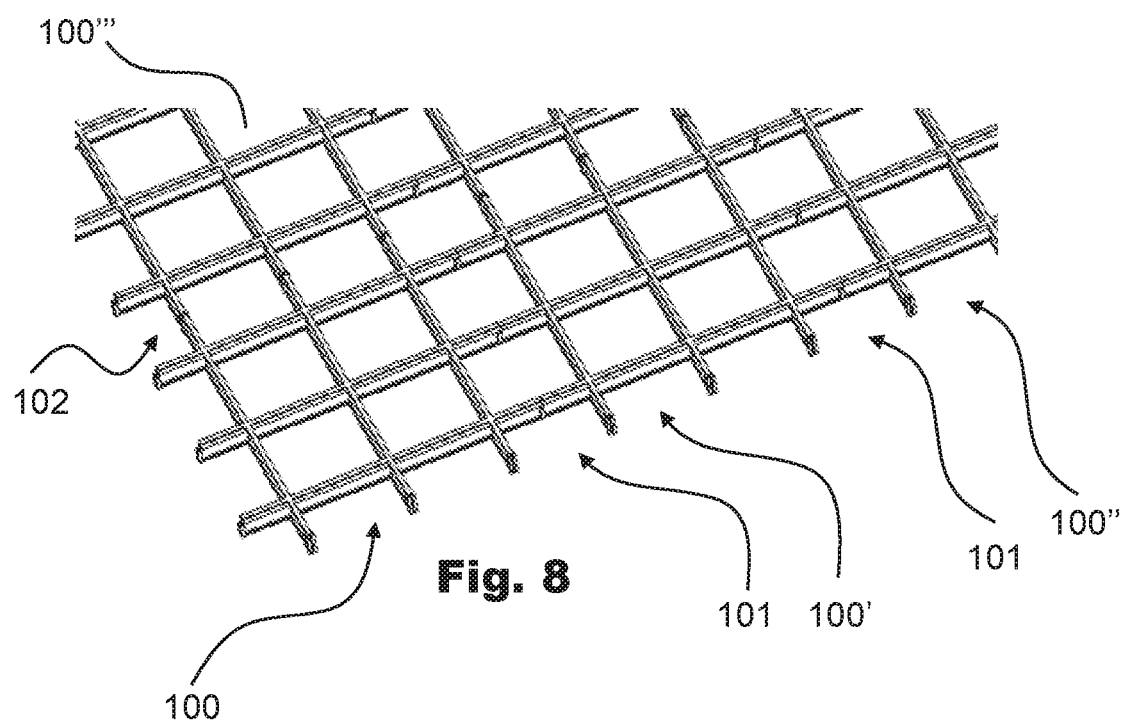
FIG. 8 shows a schematic perspective view on three irrigation system elements of FIG. 1 joined in a row with joined longitudinal frame elements.

FIG. 8 shows a schematic perspective view on three irrigation system elements 100, 100', 100'' of FIG. 1, connected in a row with joint longitudinal frame elements. The three first mentioned fluid system elements 100, 100', 100'' are connected at connection points 101 one with another, which are in a row at their free ends. Furthermore, a further fluid system element 100''' is provided behind the first irrigation system element 100 and is connected with the latter at connection points 102. Therefore, the irrigation system elements are scalable to large surfaces in a simple grid building system.

This scalability is independent from the fact if the connection points 101 and 102 are connected via interlocking system elements 140/150 provided below the fluid conduit 130 or through a connecting system as shown in FIG. 36A and FIG. 36B, provided in the vertical wall 114 or 124, which can then be far shorter than in the embodiment shown in FIG. 2.

Figure 9:
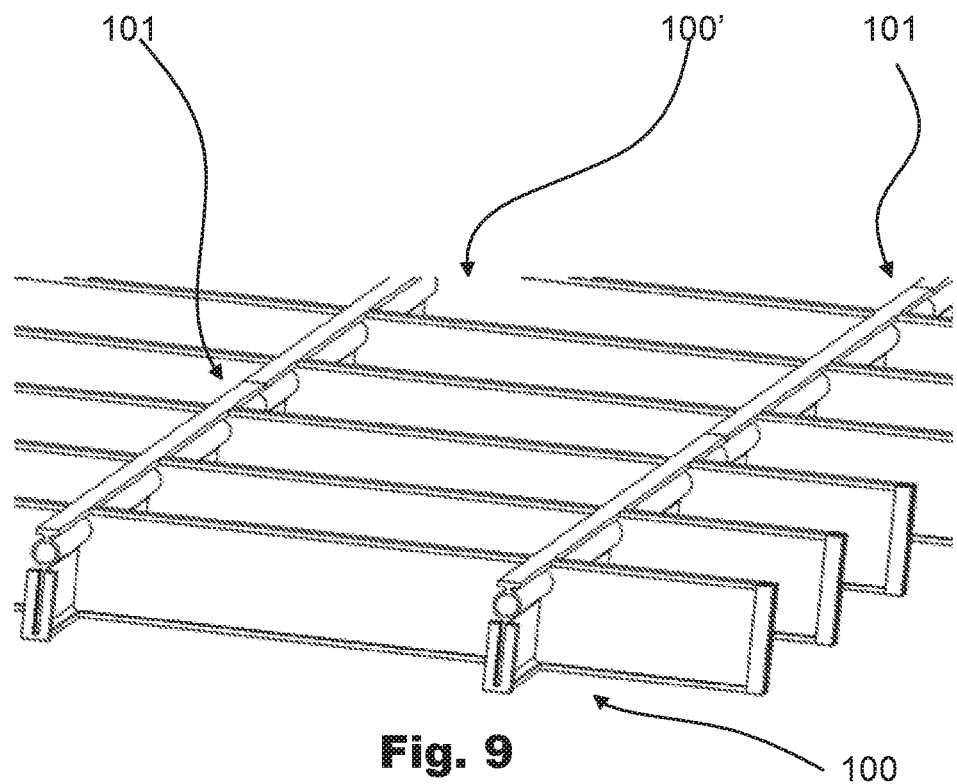
FIG. 9 shows a further schematic perspective view similar to FIG. 8.

FIG. 9 shows a further schematic perspective view similar to FIG. 8. Identical features receive the same reference numerals throughout all drawings.

Figure 10:
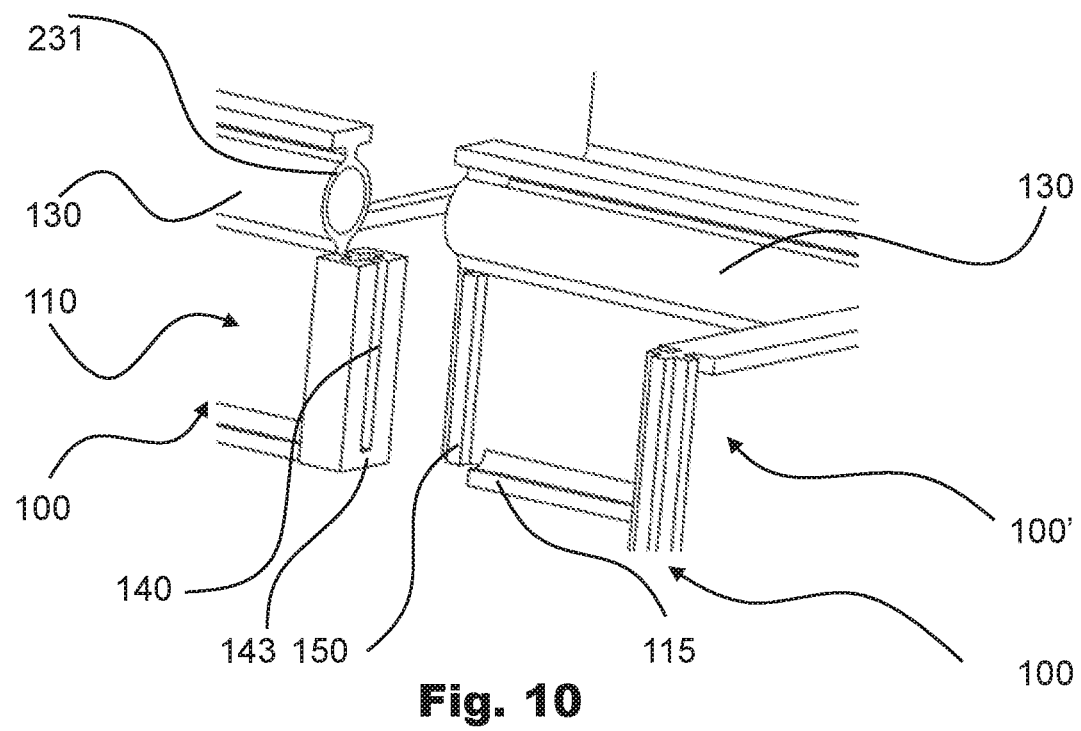
FIG. 10 shows a schematic perspective detail view on two irrigation system elements of FIG. 1 similar to FIG. 5 before joining two associated longitudinal frame elements.

FIG. 10 shows a schematic perspective detail view on two irrigation system elements of FIG. 1 represented in a way similar as in FIG. 5, before joining to associated longitudinal frame elements 110. In addition to the disclosure of FIG. 6 it can be seen that the complementary locking profile 150 ends in a specific distance above the bottom surface of the broadened base 115 in order to provide place for the abutment in socle 153 at the end of groove 140. It can also be seen in FIG. 10 that the tongues of the complementary locking profiles 150 and 250 are cross-shaped. The broadened base 115 comprises a curved concave surface starting from the vertical wall 114 and ending at the free end of the base edge.

Figure 11:
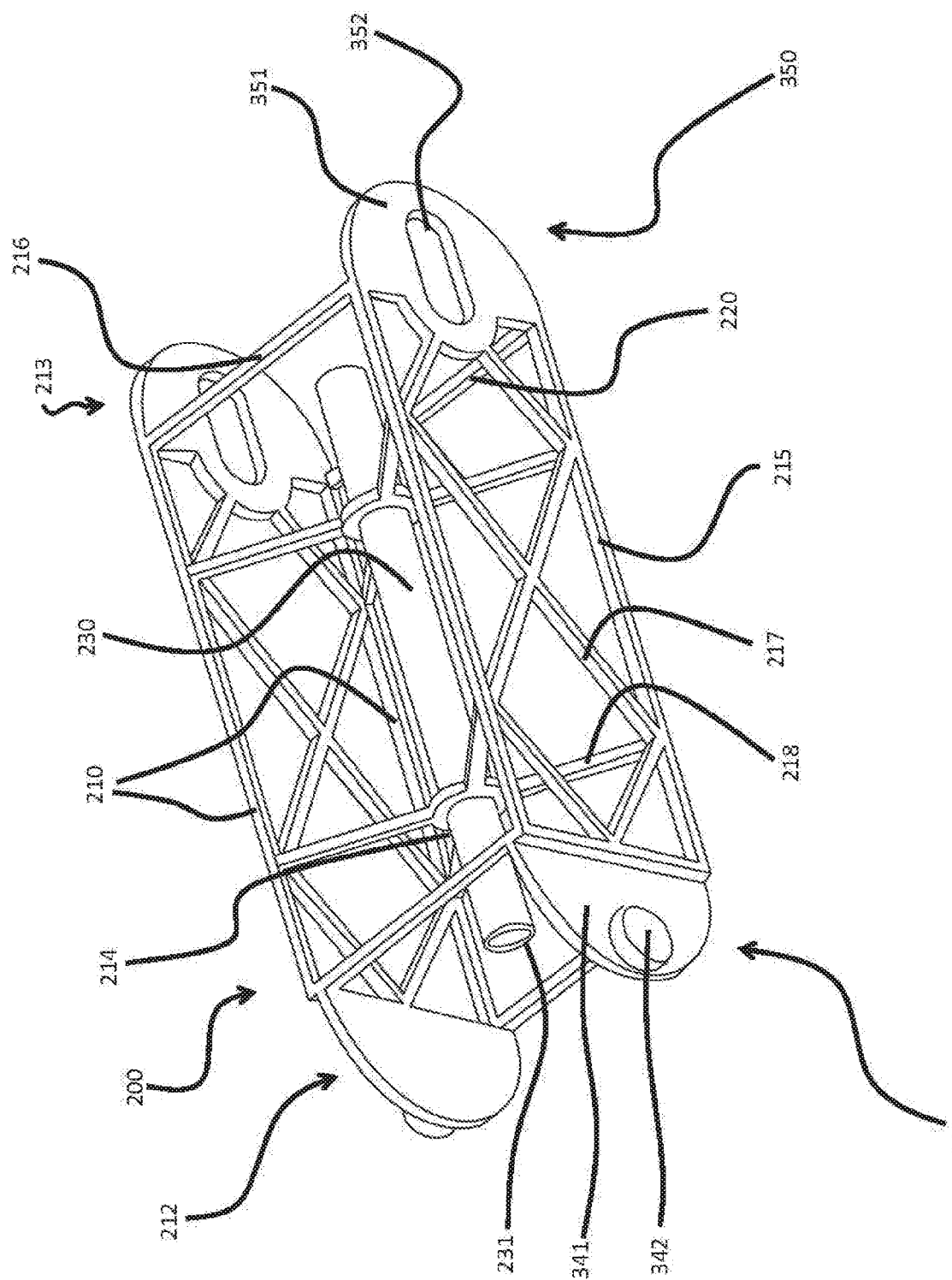
FIG. 11 shows a schematic perspective view on an irrigation system element according to a second embodiment of the invention.

FIG. 11 shows a schematic perspective view on an irrigation system element 200 according to a second embodiment of the invention. Here, the walls take another rectangular space around the fluid conduit 230 and comprise four longitudinal frame elements 210 spanning a virtual rectangular space, being connected with radial webs 218, ending in a conduit holder 214, which can be a one-piece-ring, through which the fluid conduit 230 is engaged. Additional stabilizing webs 215 can be provided between the longitudinal webs 217, whereas additional transverse webs 216 are provided at the free longitudinal ends of the irrigation system element 200. The transverse webs 216 constitute parts of the transverse frame element 220, wherein there are no parallel fluid conduits 230 as in the first embodiment.

At the free ends 212 and 213, near the transverse webs 216, are provided the locking profile 340 and the complementary locking profile 350. The complementary locking profile 350 at the free end 213 comprises two lugs, integrated at the ends of the longitudinal webs 217, wherein the webs are full material plates 351 with a longitudinally extending oval hole 352, creating a lug.

On the locking profile part at the opposite free end 212, similar full material plates 342 are attached at the corner between two longitudinal webs 217, where the transverse webs 216 are joining the longitudinal webs 217 with the proviso that the side plate 342 is provided just the amount of thickness of the plate 351 on the inside of the free space in order to allow pushing the plates 351 on the outside of the plates 342 in a way that the locking button engages the longitudinal oval hole 352. This has the advantage that the button 342 is not entirely fixed but allows a movement of one irrigation system element 200 against another as will be shown in subsequent FIG. 14.

FIG. 12 shows a schematic perspective view on five irrigation system elements 200 of FIG. 11, when joining two associated longitudinal frame elements 210, one after the other. Then, one button 342 engages the longitudinal oval hole 352 of the next irrigation system element 200. It can be seen from FIG. 12 that the mouth 231 of every fluid conduit 230 is in a predetermined distance one from the other and are not completely connecting to a continuous fluidway. This intermediate space is filled in the embodiment according to the invention through a flexible conduit element (not shown in FIG. 12) attached on both fluid conduits 230. Said flexible conduit element can also be a corrugated conduit element.

FIG. 13 shows a schematic perspective detail view of FIG. 12.

FIG. 14 shows a schematic perspective view of the five irrigation elements 200 as arranged in FIG. 12 with a transverse offset between each set of the subsequent irrigation system elements 200, using the interlocking system connection 340, 350 as a hinge system, allowing to pivot the general orientation of adjacent fluid conduits 230 around an axis being at the horizontal connection between buttons 342. Then it is even more important to have flexible connections between adjacent fluid conduits 230 as e.g. corrugated polymer.

Figure 15:
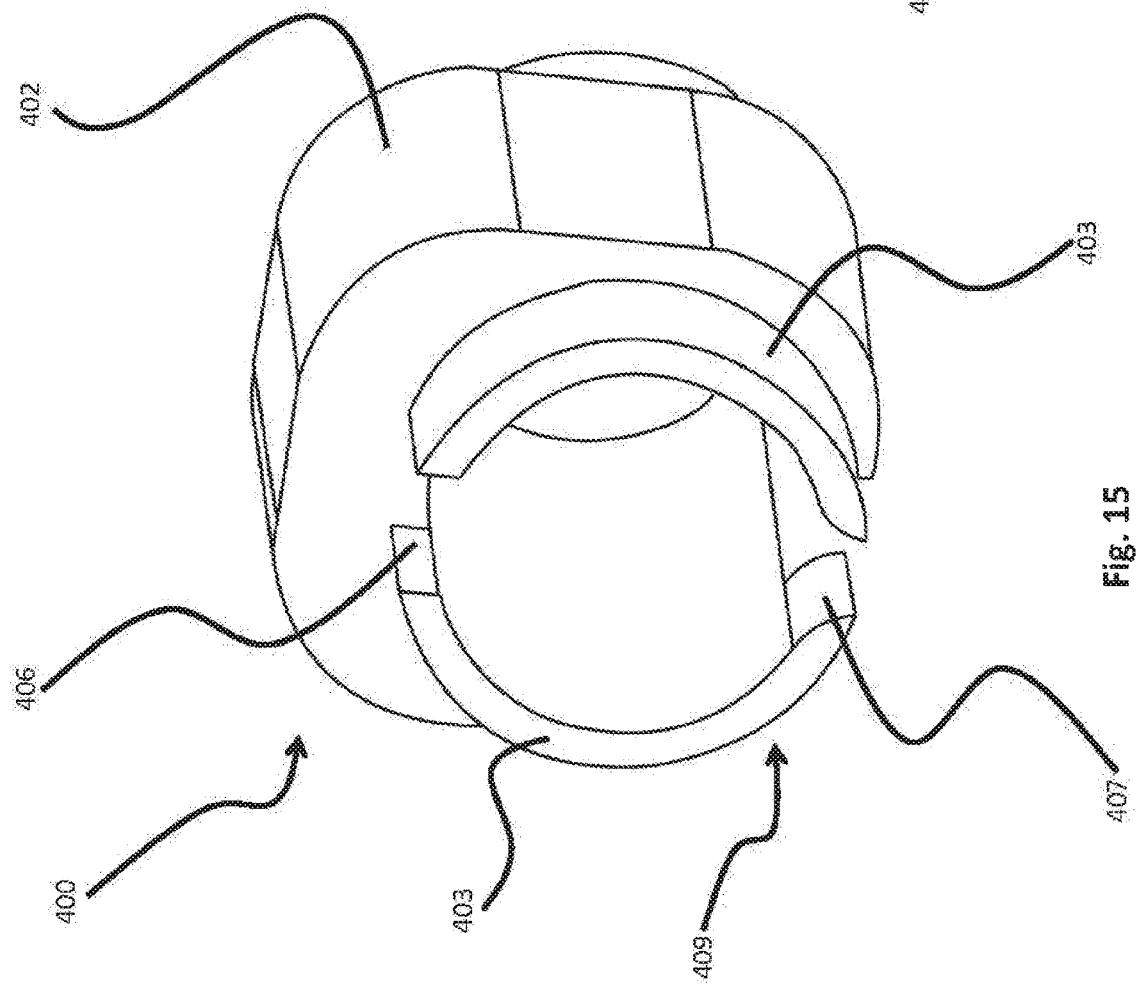
FIG. 15 shows a schematic perspective view of an outer connector to connect two fluid conduit portions of any embodiment disclosed herein.
Figure 17:
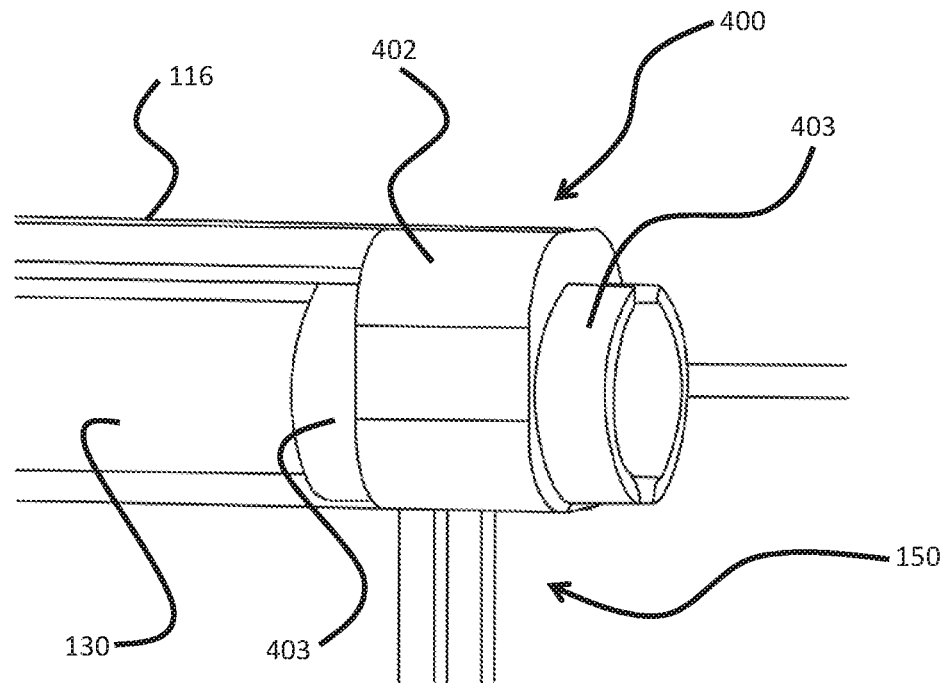
FIG. 17 shows a schematic perspective view of one free end of an irrigation element with a connector applied on the fluid conduit.
Figure 18:
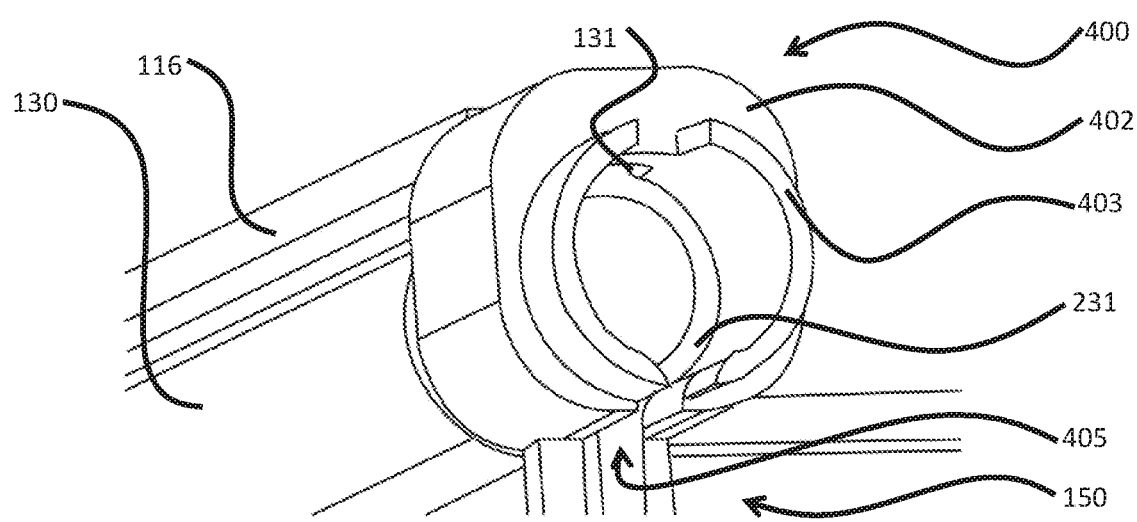
FIG. 18 shows a schematic perspective view of one free end of an irrigation element with a connector applied on the fluid conduit as in FIG. 17, slightly from below in a partial front view.

FIG. 15 shows a schematic perspective view of an outer connector 400 to connect two fluid conduit portions of any embodiment disclosed herein, especially of the embodiment of FIG. 1 to 10 and FIG. 22 to 23, wherein the irrigation system element of FIGS. 17 and 18 can be configured according to any of the before mentioned embodiments.

The connector 400 can be clamped over the joining sections of fluid conduit 130 to limit structural creep and to localize any movement with sustaining damage, such as cracks, etc. Within this embodiment clamping is understood to position the connector 400 over the two adjacent mouths 231 of irrigation system elements 100 and 100', independent from the fact how these irrigation system elements 100 and 100' are connected, i.e. via the complementary locking profiles 140 and 150 or via the connector shown in FIG. 36.

The outer connector 400 comprises a central flange element, which comprises a slit in the longitudinal direction of the inner central opening 409. Therefore, the connector can be applied after putting two irrigation system elements 100 and 100' together to increase the stability of the fluid conduit 130 connection. The flange part has two side conduit connectors 403 on both sides, wherein each side connector 403 comprises two essentially half circle portions. The two portions are separated by the longer slit 405 in the direction of the longitudinal direction of the fluid conduit and a further cut-out on the side opposite to slit 405, separating the two side connector 403 parts towards the central flange 402. The cut-out takes out a part of the circumferential material and leaves a flat upper half end surface 406. On the lower side, the slit 405 comprises a lower half curved inner surface 407, starting at the free end of the lower part of the outer connector to the inner diameter of the connector 400, providing the inner diameter 409 for the fluid conduit (as shown in FIG. 19).

Figure 16:
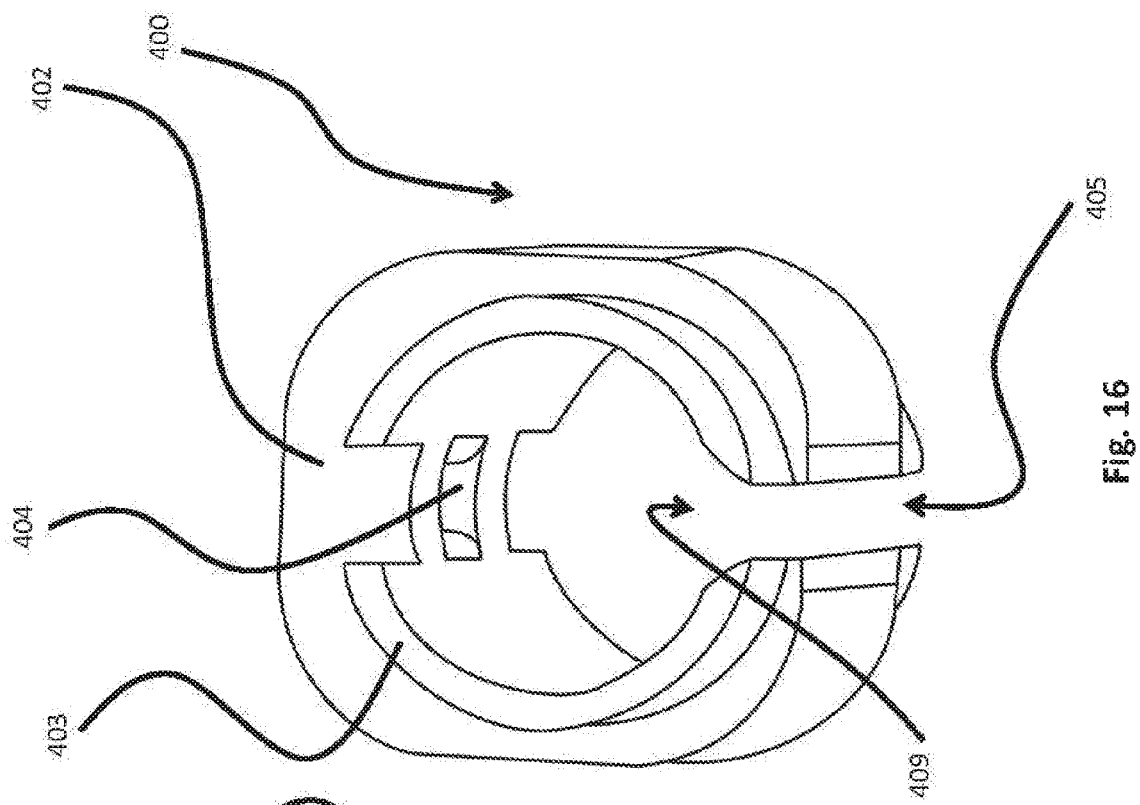
FIG. 16 shows a schematic perspective view on the connector 400 of FIG. 15, slightly from the underside.
Figure 22:
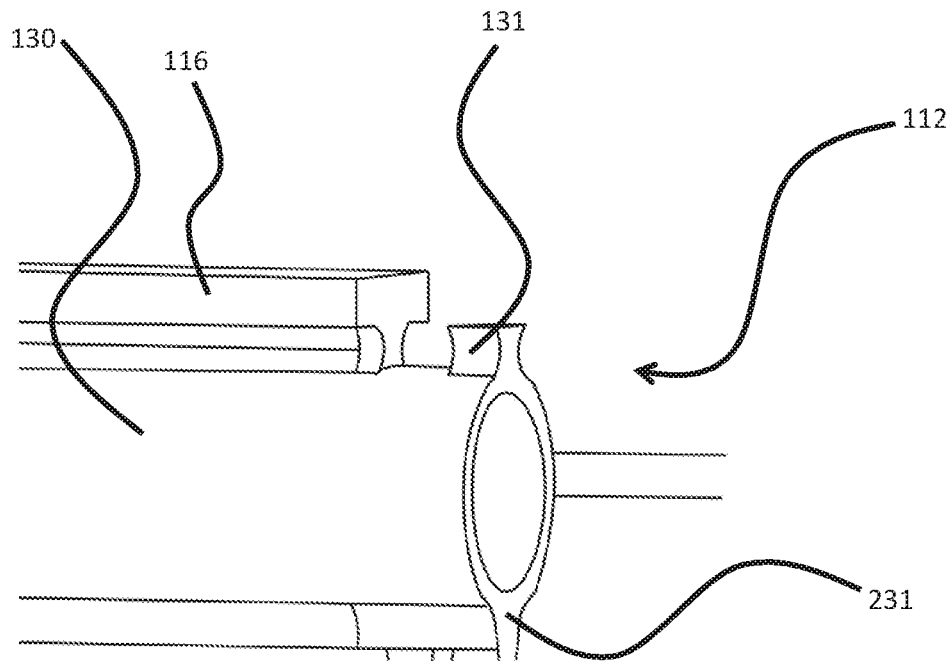
FIG. 22 shows a schematic perspective view of a slightly different free end of the irrigation system element with the fluid conduit.

FIG. 16 shows a schematic perspective view on the connector 400 of FIG. 15, slightly from the underside. It can be seen that in the central flange 402 is provided a recess 404 in the upper portion, diametrically opposite to the slit 405. Said recess 404 is intended to receive the nose 131 at the mouth 231 of the fluid conduit 130 as seen in the embodiment of FIG. 22, wherein the front end of the fluid conduit 130 is configured slightly different to the embodiment shown in FIG. 1 to 10 and is related to the embodiment of FIGS. 22 and 23.

FIG. 17 shows a schematic perspective view of one free end 112 of an irrigation element 100, where a connector 400 is applied to one free end of the fluid conduit 130. This can be the irrigation element 100 from FIG. 1 to 8 but also the irrigation element from FIG. 22. The center flange 402 abuts against the front end of the cover plate 116. The center flange 402 contacts the complementary locking profile 150 from above. The side conduit connectors 403 are slid onto the outer cylinder surface of the fluid conduit 130, wherein the upper half end surface 406 is positioned against the end portions of the neck portion of the cover plate 116.

FIG. 18 shows the same situation as FIG. 17 slightly from below in a partial front view. It can be seen, that the slit 405 encompasses the web connecting the interlocking profile 150 with the fluid conduit 130 from both sides, whereas the side elements of the profile 150 are just positioned under the connector 400. The mouth nose 131 (see FIG. 22) enters the complementary 404, so that the connector 400 remains oriented in this predetermined angular position on the free end of the fluid conduit 130.

Figure 27:
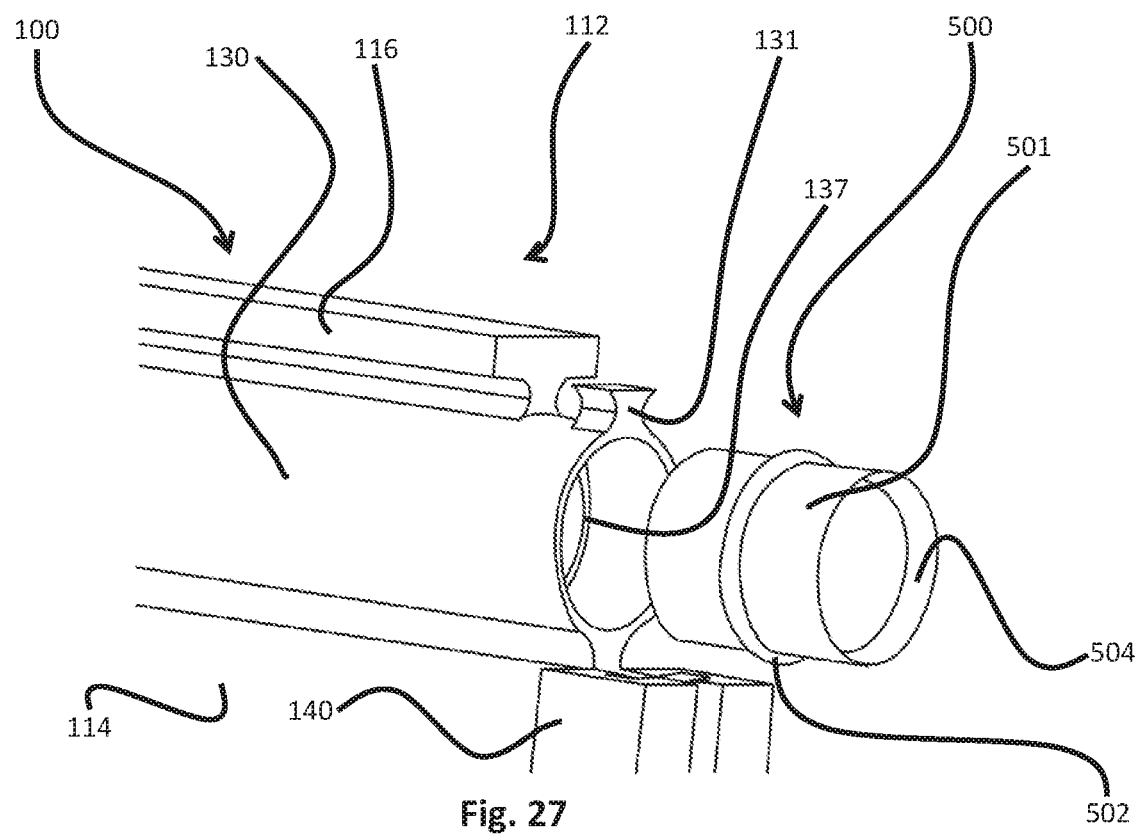
FIG. 27 shows a schematic perspective view of a free end of the irrigation system element according to the embodiment shown in FIG. 1 to FIG. 10.
Figure 28:
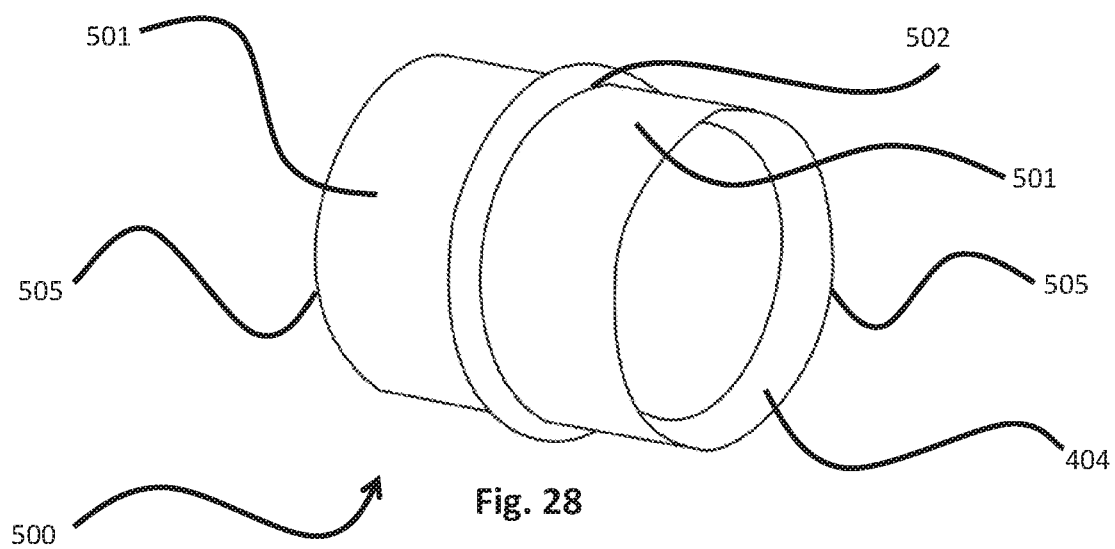
FIG. 28 shows a schematic perspective view of a gasket as insert for a connector according to FIG. 15.

FIG. 19 shows a schematic perspective side view of the connector 400, wherein some broken lines show the gasket 500 from FIG. 28 as positioned inside of the connector 400. It is noted that the side flanges 403 of the connector 400 are omitted and are not shown in FIG. 19. The side flanges 403 would encompass the fluid conduit 130. Reference numeral 137 is related to the shoulder within the fluid conduit 130 as also seen in FIG. 27 providing an abutment for gasket 500. The thickness of gasket 50 is such that it just provides the sloped tapered inner edge 504 for a slightly restricted diameter of the inner lumen in the gasket region. Recess 404 is shown sechamtically to accept the two mouth noses 131 of adjacent fluid conduits, which are not shown in FIG. 19.

FIG. 20 shows a schematic front view on the connector 400, wherein it can be seen that the gasket 500 with the internal gasket ring 502 is extending into the inner lumen 509 of the fluid conduit 130 after restriction of this inner diameter by the tapered inner edge 504 at the free end 505 of the gasket 500.

FIG. 21 shows the section side view of the connector 400 from FIG. 19 without the side flange providing the conduit connector 403 but with an inserted gasket 500 from FIG. 28, wherein arrows are reflecting the fluid flow through the connector gasket combination. The gasket 500 has been designed using an elasto-polymer that extends to the inner walls of the connector 400 when the media fluid pressure increases. The advantage of the use of the elastic polymer is strength durability reinforcement against wear and tear over. The gasket 500 has a ripped and corrugated (not shown in the drawing) length to ensure bonding to the outer part against the inner part of the main section of the connector 400. It comprises a slope 504 that tapers on both the inlet and outlet part of the gasket 500 to minimize pressure flow disruption and to limit leakage. The media in stream 550 in the middle portion is passing through the gasket 500 in the connector 400 to exit on the opposite side as exit media stream. The side stream is following the thickening slope 504 on the inlet side as restricting media stream 560 to exit the gasket on the opposite side in longitudinal direction as expanding media stream 565.

FIG. 22 shows a schematic perspective view of a slightly different free end 112 of the irrigation system element 100 with the fluid conduit 130. At the mouth 231 is provided a mouth nose 131 in the direction of the cover plate 116, intended to enter a corresponding opening inside connector 400. Therefore, in this modified embodiment, the cover plate 116 ends before the mouth 231 of the fluid conduit 130.

Figure 23:
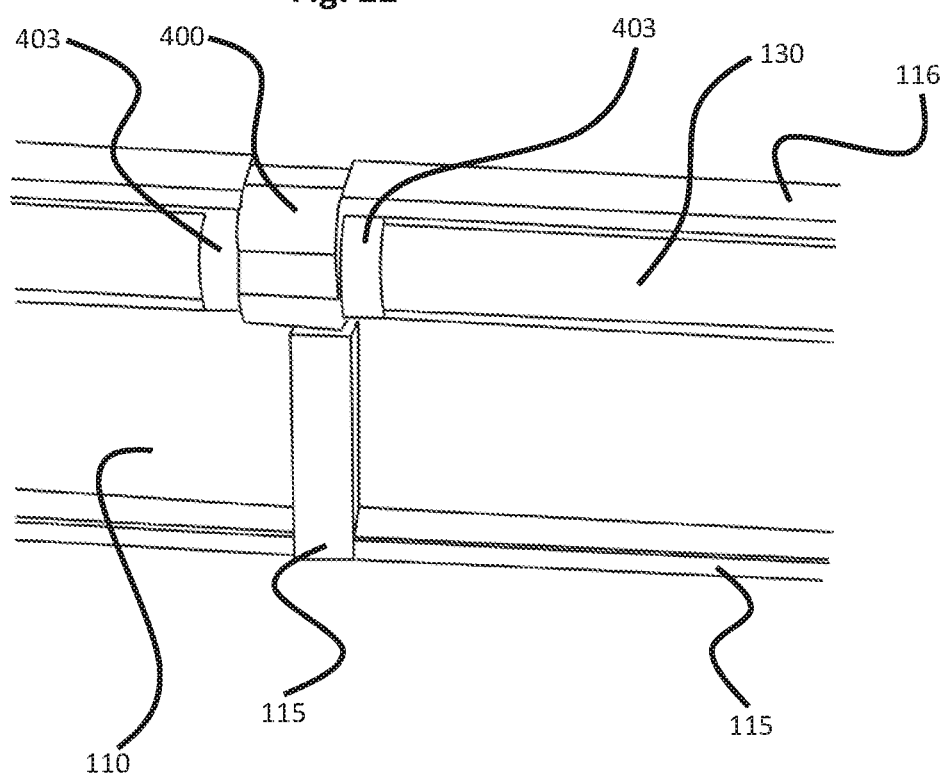
FIG. 23 shows a schematic perspective view similar to FIG. 22 with an attached second opposite free end of a second irrigation system element and the connector to stabilize the assembly as connected device.

FIG. 23 shows a schematic perspective view similar to FIG. 22 with an attached second opposite free end of a second irrigation system 100 element and the connector 400 to stabilize the assembly as connected device. Of course, the connector 400 is provided after joining the two free ends 112. The two side connector parts 403 are positioned around the two opposite halves of the fluid conduit 130 with the central flange 402 in the middle, wherein the open cut-out portion between surfaces 406 is positioned underneath the cover plate 116.

Figure 24:
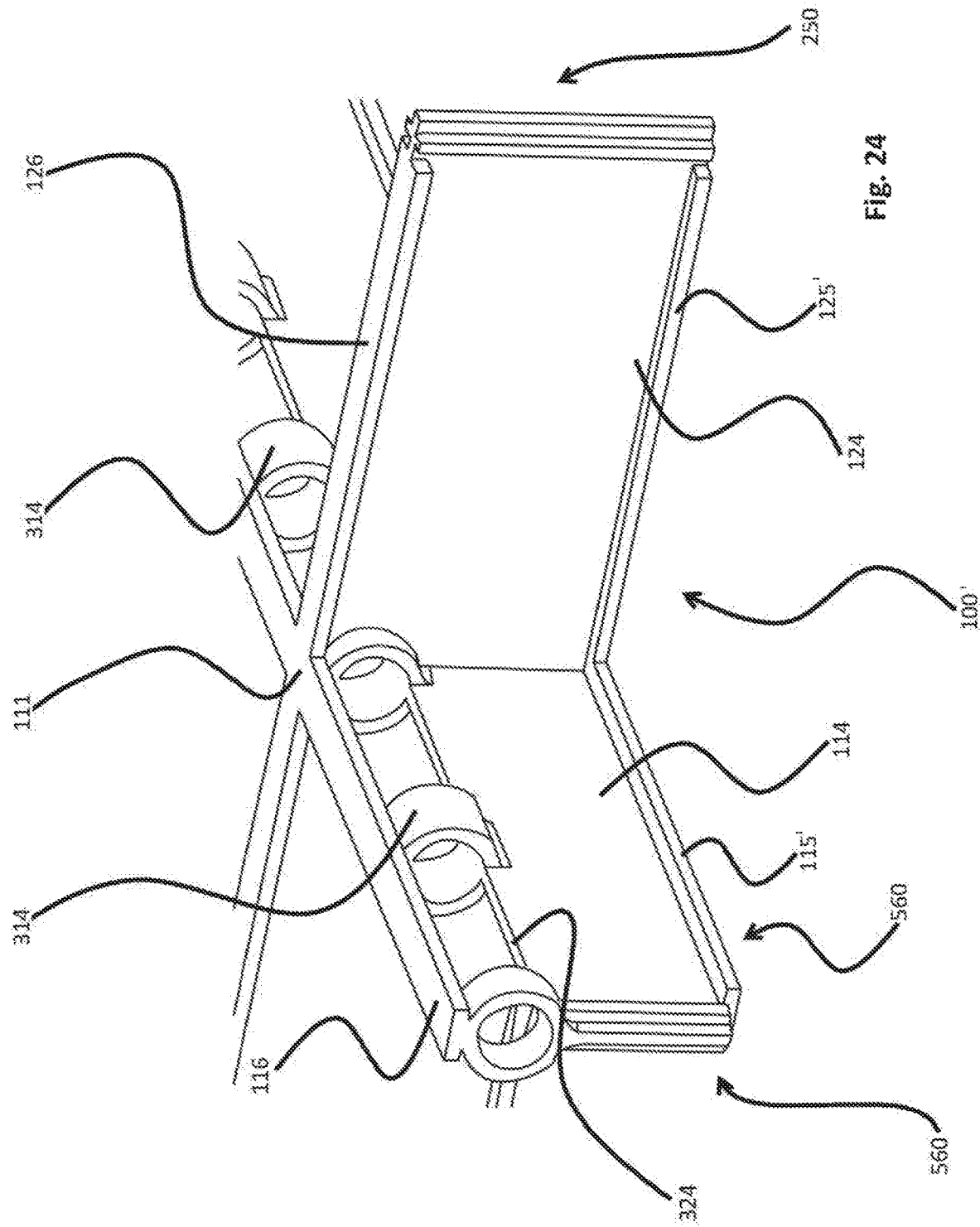
FIG. 24 shows a schematic perspective explosion detail view of an embodiment of an irrigation system element with some modifications compared to the embodiments of FIG. 1 to 10.

FIG. 24 shows a schematic perspective explosion detail view of an embodiment of an irrigation system element 100 with some modifications compared to the embodiments of FIGS. 1 to 10 as already mentioned in connection with FIGS. 22 and 23. The main difference relies on the fact that the fluid conduit pipe is not shown in FIG. 24 and it is not part of the supporting structure of the irrigation system element 100', there is the transverse element 120 but the longitudinal element 110' comprises the wall 114, which ends at the upper edge surface 324, being followed by a plurality of holder rings 314, being connected at their upper parts to the cover plate 116. One of the holder rings 314 is provided at the breakthrough in the wall 124. Within this embodiment, it is possible to provide a grid of irrigation system elements put together with the corresponding complementary interlocking profiles 150 and 250, wherein a separate fluid pipe (not shown in FIG. 24 but could be according to the pipe of FIG. 33) is pushed through the holder rings 314, when the grid has been formed. Further differences relate to the kind of broadened bottom parts 115', 125', which are in a block shape and not comprising a rounded surface to connect to the wall parts 114 and 124 as for the irrigation system element 100 of FIG. 1.

Figure 25:
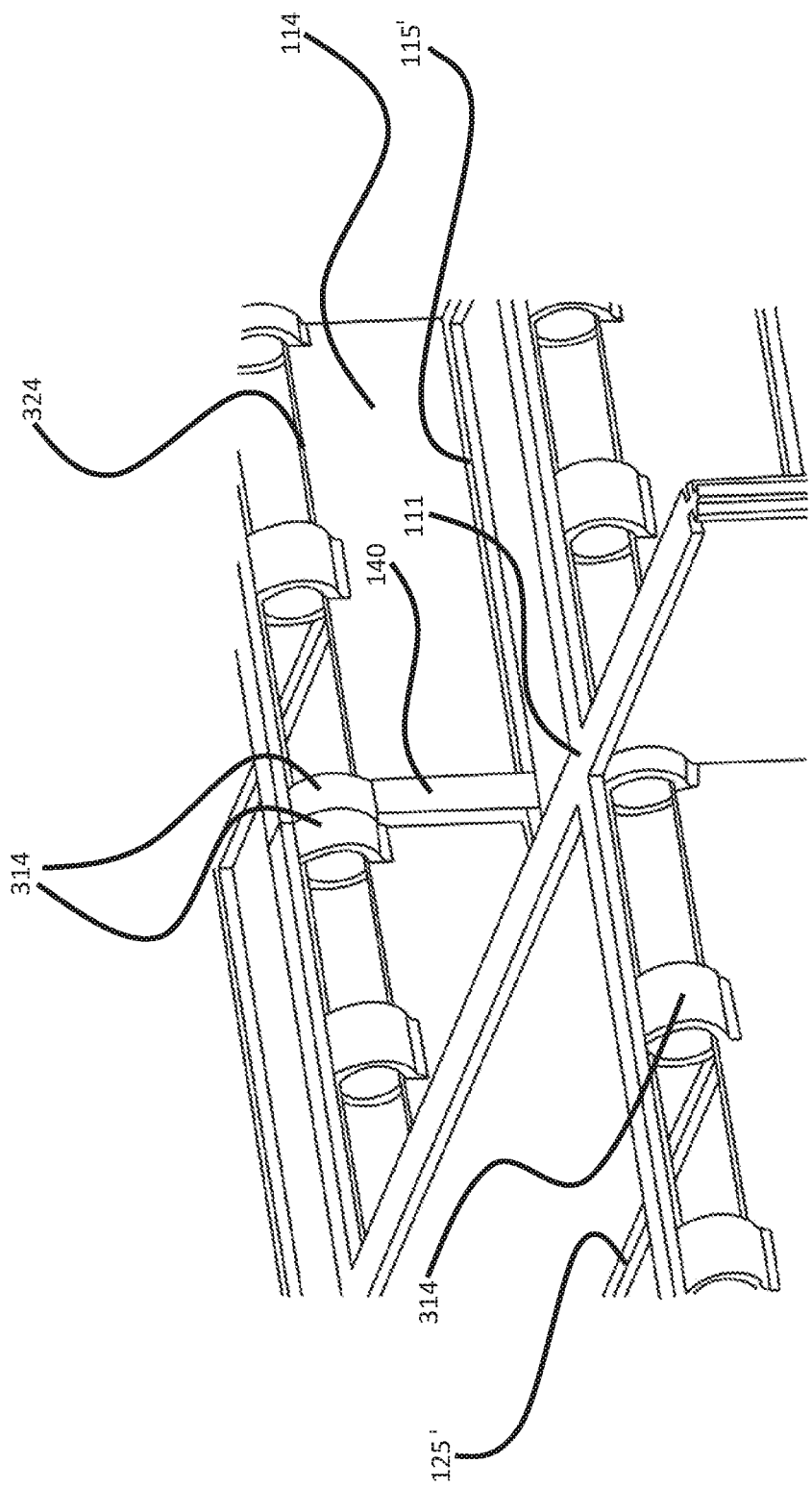
FIG. 25 shows a schematic perspective details view of two irrigation system elements according to FIG. 24 put together at the longitudinal side.

FIG. 25 shows a schematic perspective details view of two irrigation system elements 100' according to the embodiment of FIG. 24 put together at the longitudinal side, where two holder rings 314 at the free ends are just touching one the other. In this embodiment it is not to crucial that the connections of the irrigation system elements 100' are stabilized more than through the locking profile 140 and complementary locking profile 150, since the introductions of the through going pipe (not shown in FIG. 25 but can be according to the embodiment of FIG. 33) provides an improvement in view of the stability of the fluid irrigation system.

Figure 26:
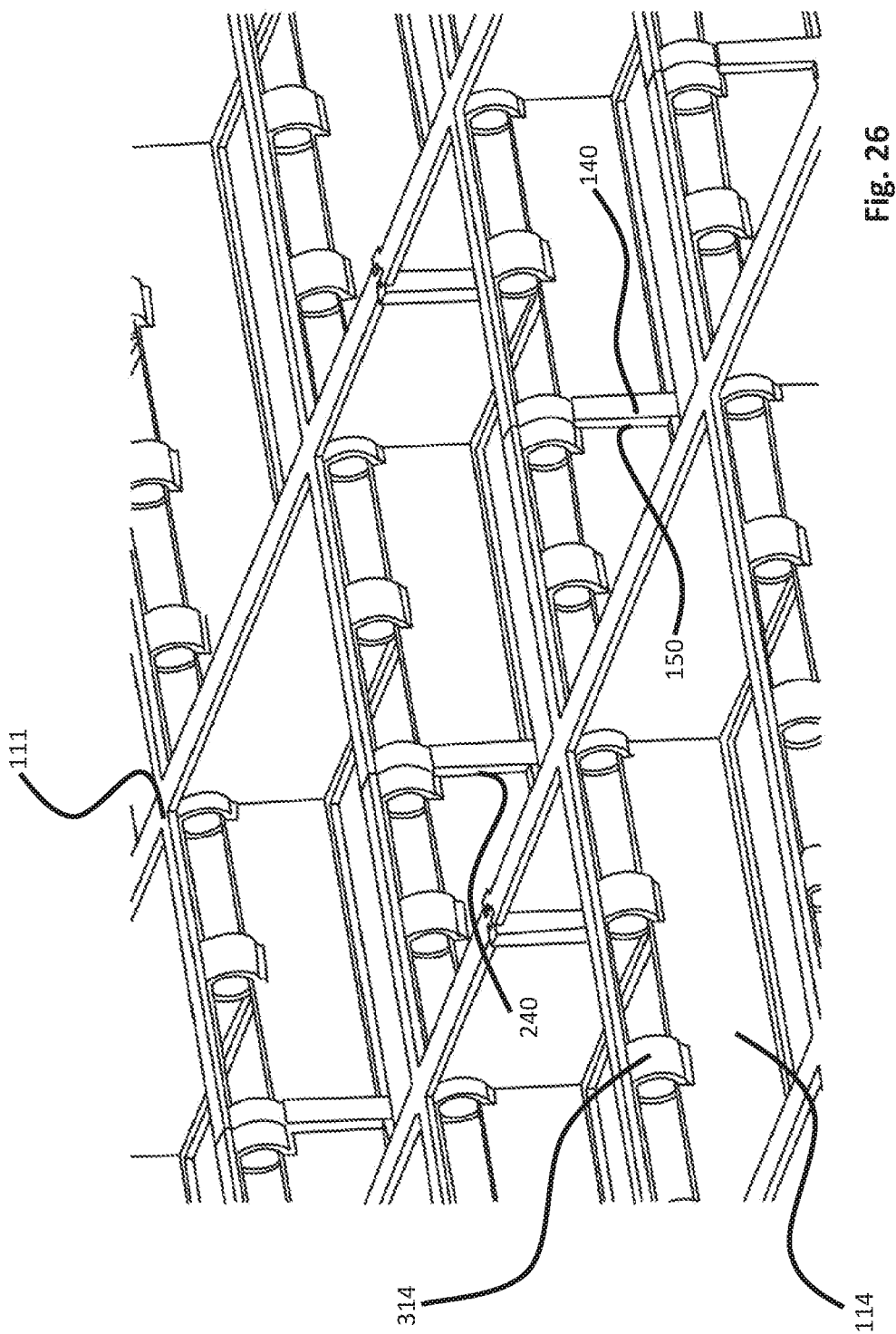
FIG. 26 shows a further perspective overview of the embodiment of the irrigation system element as shown in FIGS. 24 and 25.
Figure 33:
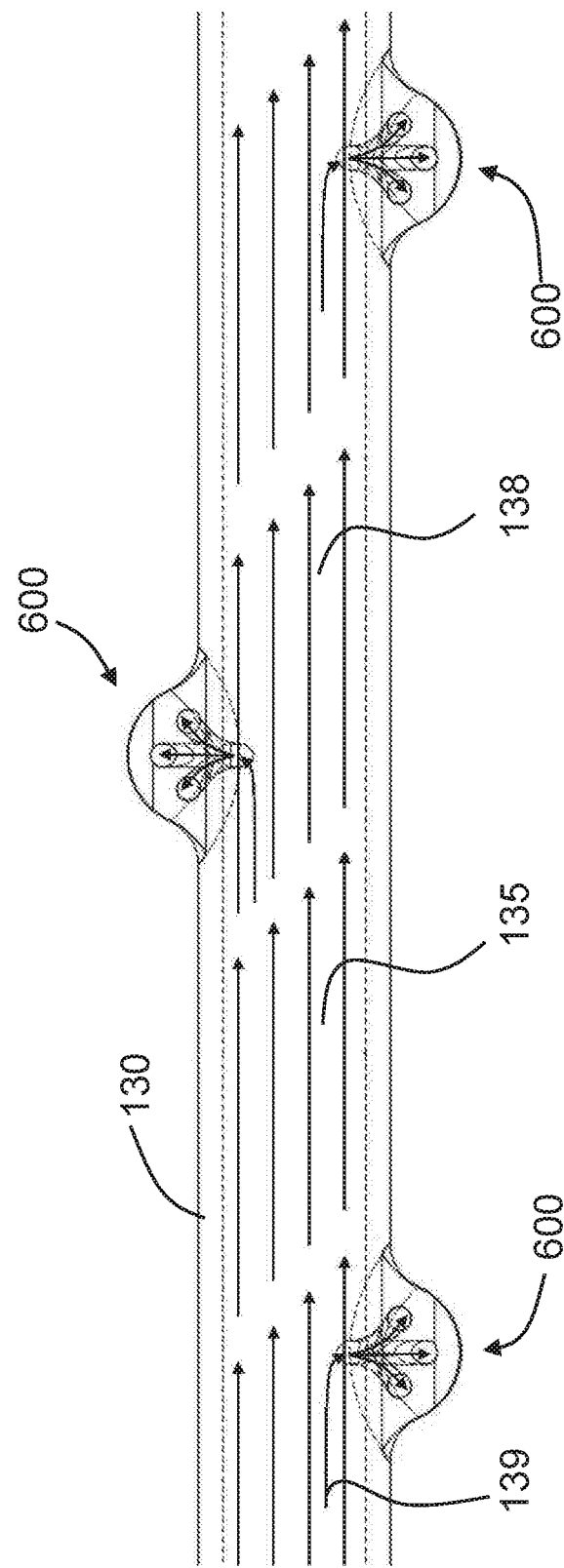
FIG. 33 shows a schematic perspective side view with partial cross sectional lines reflecting the fluid conduit of any of the foregoing embodiments with three alternately positioned spouts according to FIG. 29 to 32, each having three outlets.

FIG. 26 shows a further perspective overview of the embodiment of the irrigation system element 100' as shown in FIGS. 24 and 25, also reflecting the connection at the complementary locking system 240 at the transverse side walls. A fluid conduit 130 as shown in FIG. 33 can be introduced into the system according to FIG. 26, since the holder rings 314 are rigid but the fluid conduit 130 is e.g. made out of PE or another flexible polymer material which can be introduced through the rings 314 independent from the fact if there are spouts 600.

FIG. 27 shows a schematic perspective view of a free end 112 of the embodiment according to the FIG. 1 to FIG. 10, wherein a gasket 500 as explained below in connection with the perspective view of FIG. 28 is shown in front of the mouth 231 of the fluid conduit 130. Shoulder 137 is provided within the wall of fluid conduit 130 creating an abutment for the front edge 505 of the gasket 500. Then, it is not possible for gasket 500 to be introduced too far inside the fluid conduit 130 and get lost. It is also possible to provide a tapered free end for the fluid conduit as it is shown in FIG. 37 providing the same result with the advantage that the tapered curved surface 504 is less influencing the fluid flow over this passage than a shoulder 137.

FIG. 28 shows a schematic perspective view of a gasket 500 as insert for a connector 400 according to FIG. 15. There is shown the gasket ring 502 in the center with two side cylinders 501 to be introduced into the mouth 231 of the fluid conduit 130, wherein on the inside there are tapered inner edges 504, starting from the free ends 505 of the gasket 500 to reach the internal diameter with its inner surface 503, providing the fluid through pass in the system across the junction. The gasket ring 502 is positioned between the front edges of the mouths 231 and maintains tightness inside the connector 400.

FIG. 29 shows a schematic side view of a spout 600 attached to the fluid conduit 130 with an internal lumen 135. This spout 600 can be attached to the fluid conduit 130 or 230 according to any of the embodiments of the fluid system element 100, 100' etc. of the present specification which are not shown in FIG. 29. The simplest fluid outlet are holes punched through the side wall in the fluid conduit 130; usually horizontally at the greatest lumen diameter, but they can also be provided e.g. in a 45 degree angle towards the bottom. Usually, there are one to three holes between two sections of walls 124. They can be all on one side or on alternate sides.

However, an embodiment to distribute the fluid with spouts 600 according to FIG. 29 to 33 is preferred. The spout 600 comprises a nose part 601, having a free end 604 and providing an under side 602 near this free end 604, intergrading into a curved surface 603 before rejoining the wall 132 of the fluid conduit 130 of the irrigation system element 100. The spout 600 will comprise an opening in the wall 132 of the fluid conduit 130 and spout openings outlets in the area between underside 602 and curved underside 603. It has to be noted that the spout 600 is positioned mainly above the thickest part of the fluid conduit 130 in view of the vertical direction, providing a room below its nose 601 as media deposition area 625.

Figure 30:
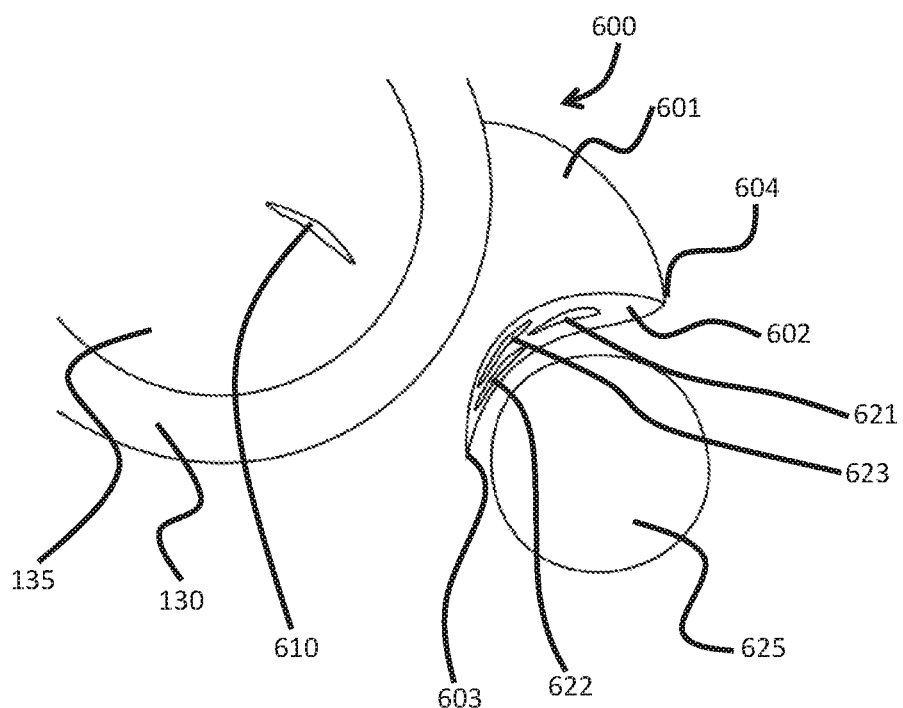
FIG. 30 shows the perspective side view of FIG. 29 with additional cross-section information relating to the media flow.

FIG. 30 shows a perspective view of FIG. 29 with additional information relating to the media flow. The nose 601 of the spout 600 has a free end 604, extending to the underside 602, which is near the nose 604 essentially parallel to the horizontal axis. Then it intergrades into the curved surface 603, within which are provided a central outlet 621 and two side outlets 622 and 623, positioned lower than the central outlet 621. There is a connection between the single combined mouth outlet 610 and the outlets 621, 622, 623.

Figure 31:
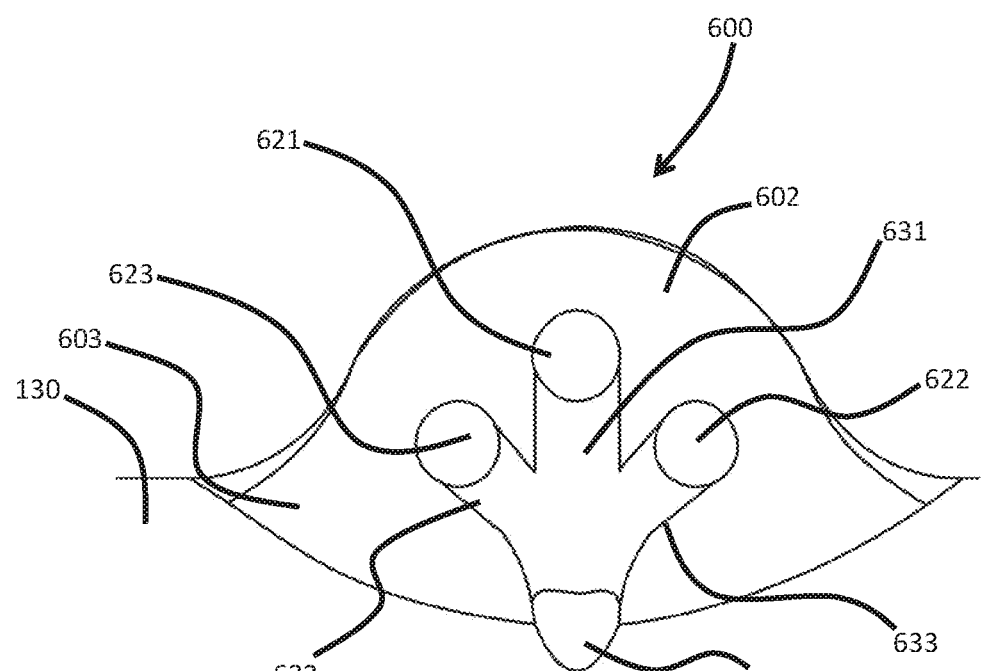
FIG. 31 shows a schematic view from below onto the spout of FIG. 29 and FIG. 30 with a partial cross section part.

FIG. 31 shows a schematic view from below onto the spout 600 of FIG. 29 and FIG. 30 with a partial cross section part, relating to said fluid pipes in the spout 600. The spout 600 is rounded in the longitudinal axis of the fluid conduit 130 and comprises three outlets 621, 622, 623, being connected with a central pipe connect 631 and two side pipe connects 632, 633, which all combined in one single outlet 610, provided in the upper half on the inner wall of the fluid conduit 130. This created a media deposition area 625 in the space between the nose 604 and the curved surface 603 intergrading into the wall 132, being a triangle in a cross-section view. This maintains the fluid droplet exiting in this area.

Figure 32:
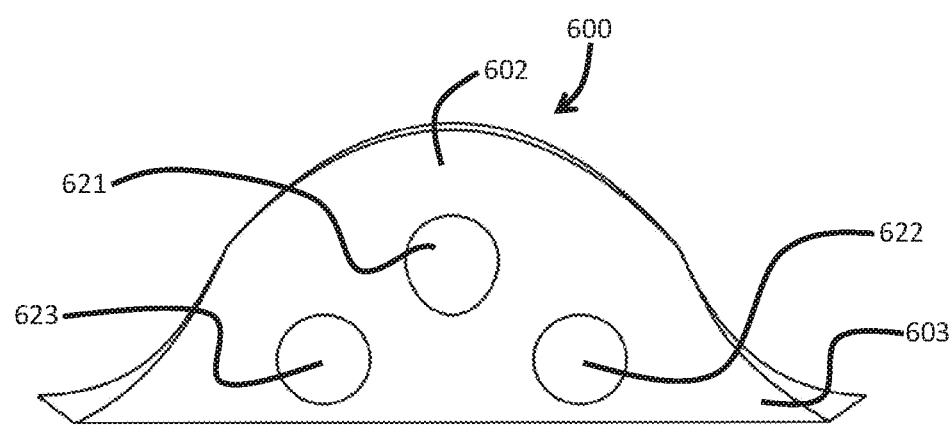
FIG. 32 shows the schematic view from below as in FIG. 31 without any representation of cross-section parts.

FIG. 32 shows the schematic view from below as in FIG. 31 without any representation of cross-section parts. The central opening 621 starts at the transition between the essentially horizontal lower surface 602 and the curved surface 603; it is slightly oval or egg-shaped with a sharper curved end in the direction of the other side openings 622 and 623 and in the direction of the wall 132 of the fluid conduit 130.

The spout 600 is configured to go from a smaller opening 610 in the wall 132 of the fluid conduit 130 to the larger cross-section of the three outlets 621, 622 and 623 in order to assist in the depressurisation of fluid at the output ports 621, 622 and 623 and to form accurate and consistent fluid bubbles in the deposition area 625 underneath in order to facilitate equal soil hydration without soil erosion/disturbance. The port is designed to have more than one outlet point in order to ensure consistent irrigation as well as decongestion of neighbouring ports.

The outlet ports 621, 622 and 623 are angled away from the soil in order to ensure that soil is not attracted to the port once operational. This is mainly advantageous for longer maintenance free operation once the irrigation system elements are deployed.

FIG. 33 shows a perspective side view with partial cross sectional lines reflecting the fluid conduit 130 with three alternately positioned spouts 600, each having three outlets. It can be seen that the central fluid flow 138 is mainly directed in the longitudinal direction of the fluid conduit and only a very small portion of the turning fluid flow 139 enters the central outlet 610 to be then distributed to the three outlets.

In a further different embodiment, it is possible to provide larger side holes in the fluid conduit 130 and a plurality of clip-on spouts 600 wherein the central spout connection 610 is inside the pin to be connected and clipped in said opening.

Figure 34:
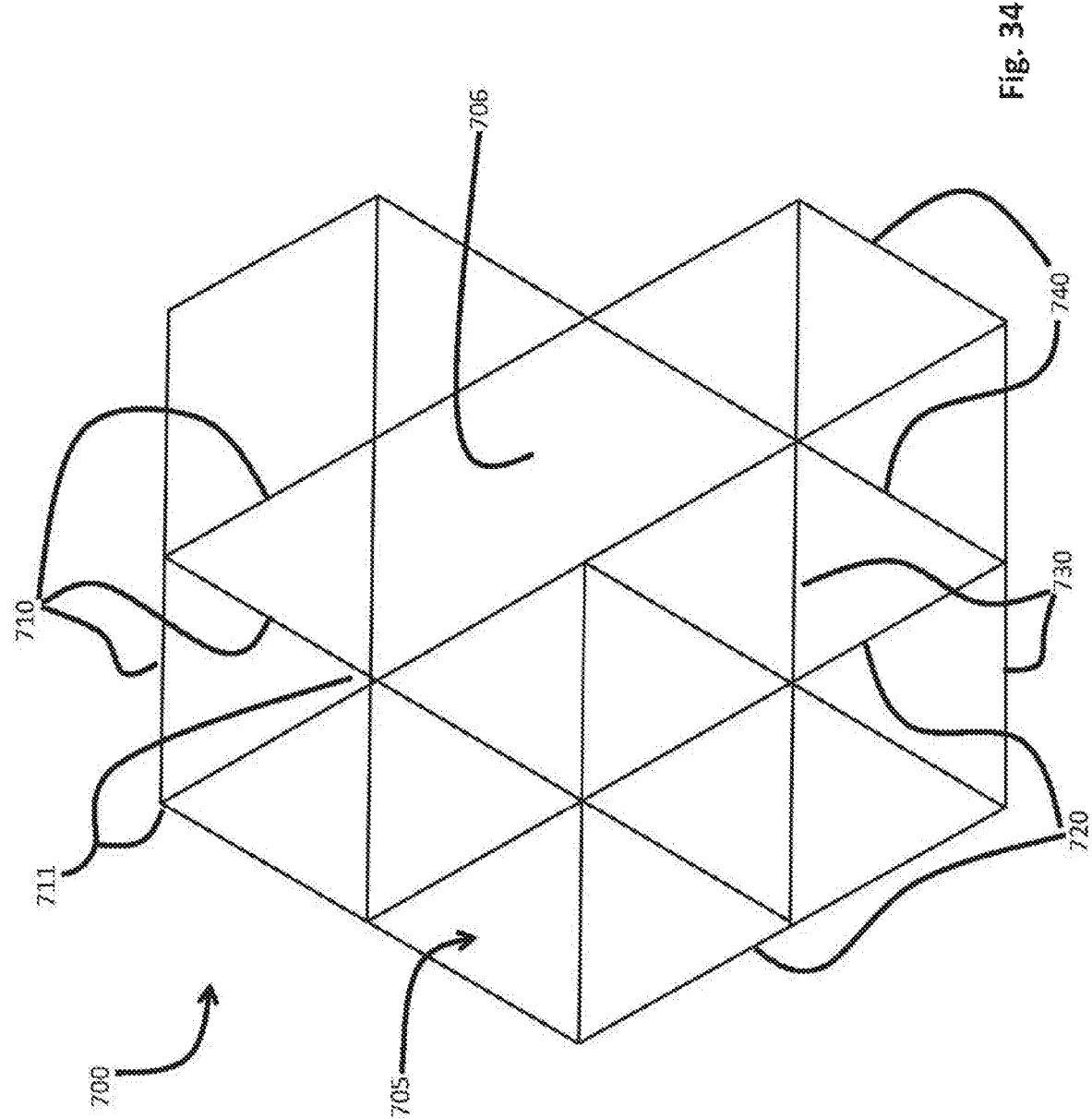
FIG. 34 shows a schematic view from above of a further embodiment of an irrigation system with a triangular arrangement.

FIG. 34 shows a further embodiment of an irrigation system 700 with a triangular arrangement, wherein the "longitudinal" structure elements 710 are provided in a triangular way. Each structure element 710 can be identical to a longitudinal frame element 110 of the embodiment of FIG. 1. Then the fluid conduits 130 are joining at the intersections 711.

Figure 38:
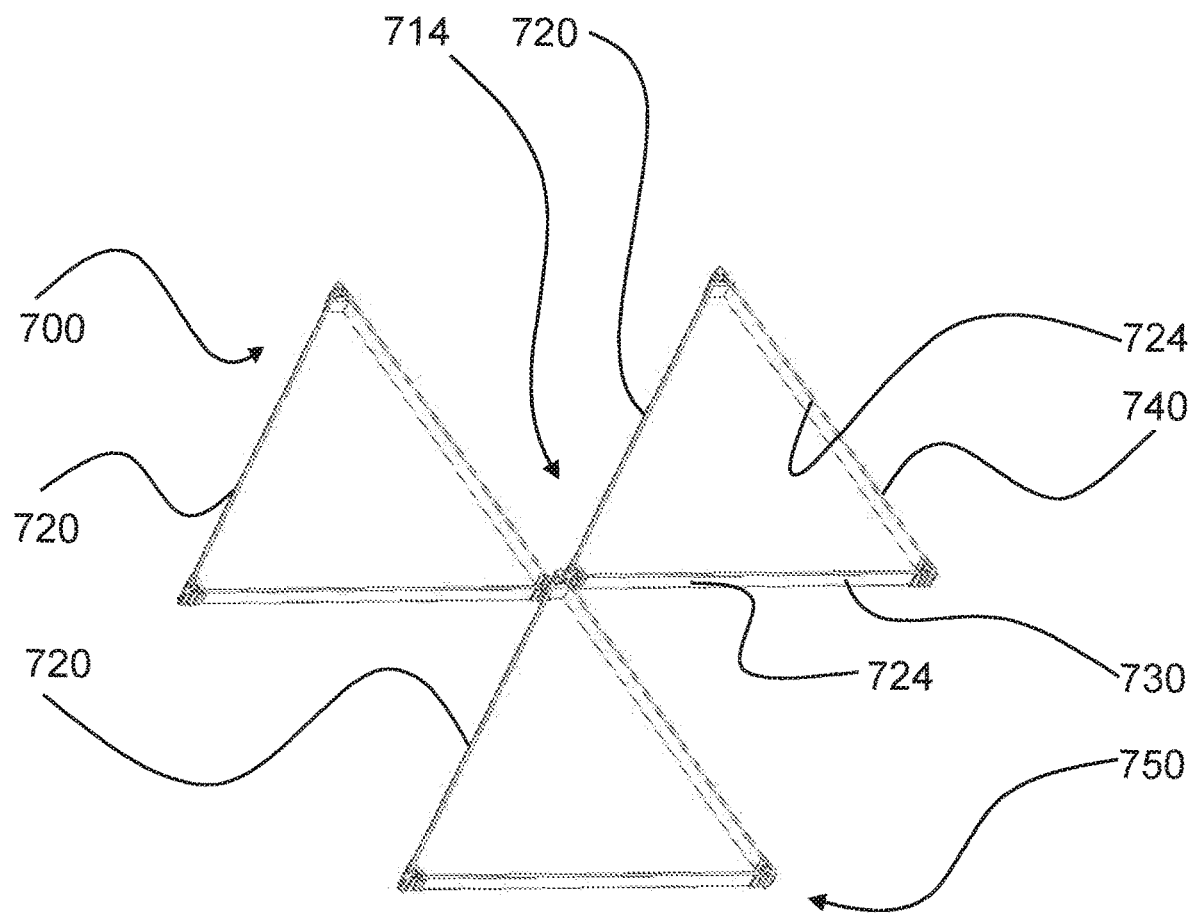
FIG. 38 shows a schematic perspective view of three irrigation elements according to an embodiment of the invention to be used to build up a triangular grid in a system according to FIG. 34.
Figure 39:
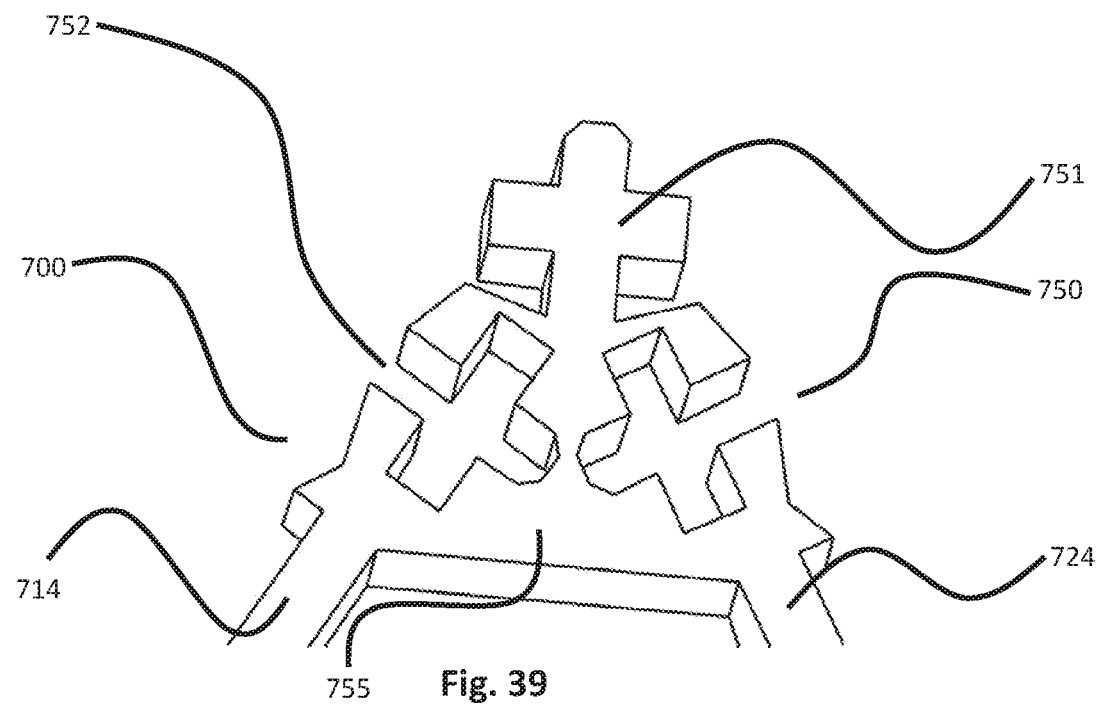
FIG. 39 shows a schematic perspective view of a connector of an irrigation element according to FIG. 38.
Figure 40:
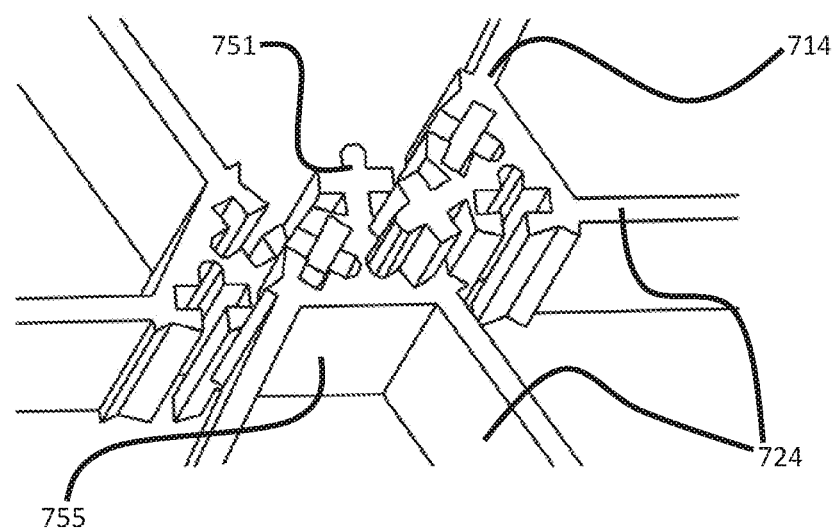
FIG. 40 shows a schematic perspective view of three adjacent connectors from FIG. 39 to be connected to form a connection point for the system of FIG. 34.

On the other side, it is also possible that only the lines 720 are providing the fluid conduits and the lines 730 and 740 are simple structural frame elements as the transverse frame elements 120 of the embodiment of FIG. 1. Each triangle space 705 can have one, two or three spouts 600 depending on the choice of fluid conduit distribution. At each corner 711 are provided three connectors as shown in FIG. 38, FIG. 39 and FIG. 40 to build the triangular structure. The advantage of this proposal relies on the fact that some triangular elements can be omitted, e.g. around trees or built structures on ground to allow nevertheless a full ground covering irrigation system. Space 706 of FIG. 34 is larger to accommodate such a structure in the interior of the irrigation structure.

In other embodiments, it is also possible to provide hexagonal space structures with an equidistant distribution of spouts 600 for every hexagonal bordered space.

FIG. 35A shows a schematic cross section view through the wall of an irrigation system element 100 similar and according to FIG. 1 with a spout 600 according to FIG. 29, wherein the wall 114 is extremely short. In fact, the wall 114 is just the connection between the fluid conduit 130 and the broadened bottom part 115 as is the opposite wall segment towards the top cover plate 116.

The difference over the representation of FIG. 1 is that the broadened base 115 comprises on one or on both sides a groove 225 provided at the bottom of the wall 114 at the upper surface in the T shaped base 115. It is possible to extend the groove 225 until the free end of the broadened base 115. The function of the groove 225 is the retention of dampness and humidity in the region 626 near the groove 225 in the corner of the L (in cross-section) as shown in FIG. 35B.

FIG. 35B shows a schematic cross section view through the wall of an irrigation system element 100 similar and according to FIG. 1 with a spout 600 according to FIG. 29, This function is additionally enhanced by the sideways extending spout 600 providing the media deposition area 625 just below the spout 600. The fluid delivered through spout 600 then is further retained in the groove 225 shown with dotted lines in the region 626.

FIG. 36A shows a schematic partly perspective view of an irrigation system 300 according to an embodiment of the invention with a modified connector element in the wall 114. Here, the interlocking element 440/450 comprises a horizontal bore 440 in the wall 114 which can have a larger wall thickness at this portion to provide the necessary stability.

The main difference over the irrigation element 100 of FIG. 1 is related to the fact that the front edge is flush from the broadened cover plate 116 to the broadened bottom plate 115 and that a bore 440 is provided below the fluid conduit 130. To connect two irrigation system elements 300 a barbed rod 450 is introduced into the aligned bores 440. The length of the bore 440 and the flexibility of the rod 450 are chosen to resist against an inadvertent dissociation of the two adjacent irrigation system element 300s.

FIG. 36B shows the barbed rod 450 as connector for connecting the irrigation system elements 300 of FIG. 36A. The barbed rod 450 is made of a flexible polymer material preferably with a stiff core allowing to enter the barbed rod 450 easily in the mouth of the bore 440 and encountering more resistance with further introduction providing a fixedly connection due to a sequence of ridges 451.

One advantage of the irrigation system element 300 is that the vertical wall portion 114 (and 124) can be chosen far shorter than for the embodiment of the irrigation system element 100 according to FIG. 1. However, it is also possible to combine the irrigation system element 300 with the noses 131 and the connector 400.

FIG. 37 shows a schematic detail side view on the front portion of a fluid conduit similar to FIG. 27. The difference in the two embodiments is that the inner shoulder 137 serving as abutment ring in the fluid conduit wall is replaced in FIG. 37 by a tapered portion 237 allowing the outer wall of gasket 500 to slide into the fluid conduit 130 against more and more resistance of the constant diameter gasket 500.

FIG. 38 shows a schematic perspective view of three irrigation elements 700 to be used to build up a triangular grid in a system according to FIG. 34. Each irrigation element 700 comprises a triangle of vertically oriented walls 714 and 724. On top of walls 714 is provided a fluid conduit 720 (not shown in FIG. 38 to 40 and/or covered under the cover plate 116) running the entire length of the wall between the two free ends, where connectors 750 are provided. There, flexible polymer pipes can be provided to connect to fluid conduits 720 of adjacent irrigation elements 700. It is possible to provide additional connectors between parallel fluid conduits 720 through Y connectors.

FIG. 39 shows a schematic perspective view of a connector 750 of an irrigation element 700 according to FIG. 38. FIG. 40 shows a schematic perspective view of three adjacent connectors 750 from FIG. 39 to be connected to form a connection point 711. Connector 750 is provided at the free end of two joining vertical walls 714 and 724 which are connected through a short transverse wall 755. The connector 750 then occupies the remaining free space until the drawn prolongation of the two walls 714 and 724. At the tip of the corner is provided a male cross shaped connector 751. The male cross shaped connector 751 can have the entire height of the walls 714 and 724 or only a part height portion. On both sides of the male connector are provided cross shaped recesses providing two female connectors 752. The main axis of the cross is perpendicular to the prolongation of the wall 714/724 line.

Then, as shown in FIG. 40 the male connector 751 of the adjacent triangular irrigation element 700 is entered and attached to the female connector 752, so that the bisectrix of the adjacent triangular irrigation element 700 is oriented perpendicular to the wall line 714. Thus it is possible to build a triangular irrigation system with always three irrigation element 700 joining together at an intersection point 711.

Preferably, the free end of the fluid conduit 720 is not connected to the underlying wall 714 so that a flexible pipe can be shunt onto the mouth 731 of the fluid conduit 720 to be connected over the intersection point 711 with a corresponding mouth 731 in the prolongation of the next irrigation element 700.

Figure 44:
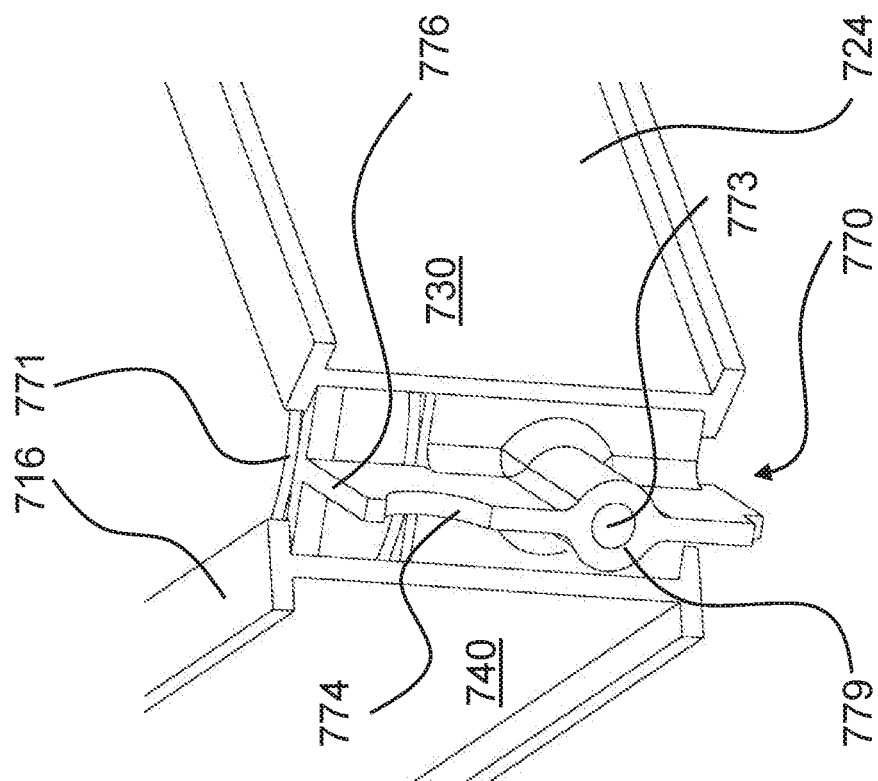
FIG. 44 shows a schematic perspective view of the third corner of the irrigation system element of FIG. 41 without the fluid conduit.
Figure 43:
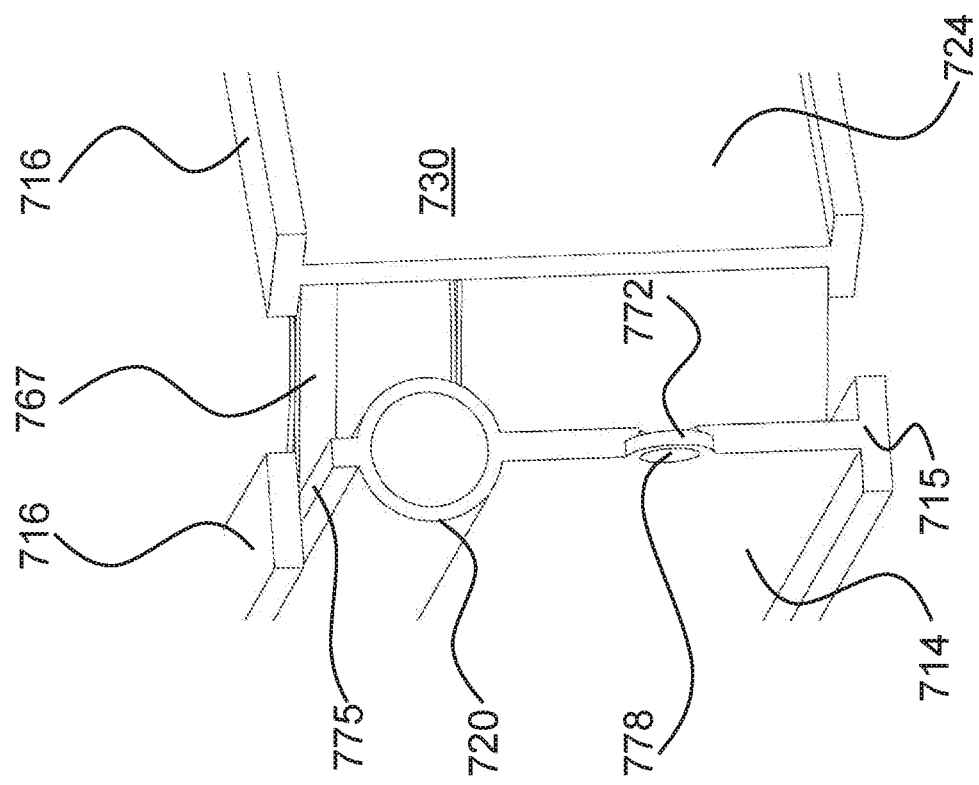
FIG. 43 shows a schematic perspective view of the opposite corner of the irrigation system element as shown in FIG. 42 with a fluid conduit.

FIG. 41 shows a schematic view from above of a further embodiment of one irrigation system element 700 of an irrigation system with a triangular arrangement. In this context, FIG. 42 shows a schematic perspective view of a corner of the irrigation system element 700 of FIG. 41 with a fluid conduit 720 and FIG. 43 shows a schematic perspective view of the opposite corner of the irrigation system element 700 as shown in FIG. 42 with a fluid conduit 720. Finally, FIG. 44 shows a schematic perspective view of the third corner of the irrigation system element of FIG. 41, i.e. at the corner without the fluid conduit 720 where the other side walls 724 of the triangle meet.

The triangle of the irrigation system element 700 of FIG. 41 has a bottom line with a fluid conduit 720, positioned below a top plate 716 as shown in FIG. 42. The fluid conduit 720 extends beyond the top plate 716 on the left side of FIG. 41 with the half sided reception 768. This corner is then shown in FIG. 42. The opposite corner of this base line is shown in FIG. 43.

FIG. 42 shows the corner, where the two walls 714 and 724, of the triangle part with the fluid conduit 720 and the structure element 740 are connected with the triangular connection wall 767, wherein the fluid conduit 720 with its upper edge 775 extends beyond the cover plate 716 and is supported by the wall 714 with the broadened base 715. In the middle of the wall height is provided the half sided reception 768. The wall thickness is used to provide to different connection portions. On the right side of FIG. 42 is a semi-circular recess as reception and on the other left side of the reception 768 is a cut-out to accommodate the pin 763 of the connector of FIG. 48.

FIG. 43 shows the opposite corner of the baseline with the structure element 730 being connected with a further triangular connection wall 767 and facing the fluid conduit 720. Here, the extension 772 is only provided with a thickness of one half of the wall thickness of wall 714 on the side to be complementary to the reception 768 as shown in FIG. 42. The broadened base 715 is shown as a T shaped free end having the same side dimension as the cover plate 716.

FIG. 44 finally shows the third corner where the structural elements 730 and 740 are directed to this corner but ending with the free ends before reaching the actual corner point in a view from above. The structural elements 730 and 740 are connected via the connection wall 771, from which is extending the triangular connector 770 on the bisecting line. This connector 770 has an upper wall edge 776 being provided at the same height as the upper wall edge 775 of the fluid conduit 720. Below the upper wall edge 776 is provided the semi-spherical recess 774 having a diameter to accommodate a corresponding outer surface portion of the fluid conduit 720. Below this recess is provided a thickened wall extension 779 with a central bore 773, preferably at half-way between the fluid conduit 720 recess 774 and the bottom of the connector 770.

Figure 45:
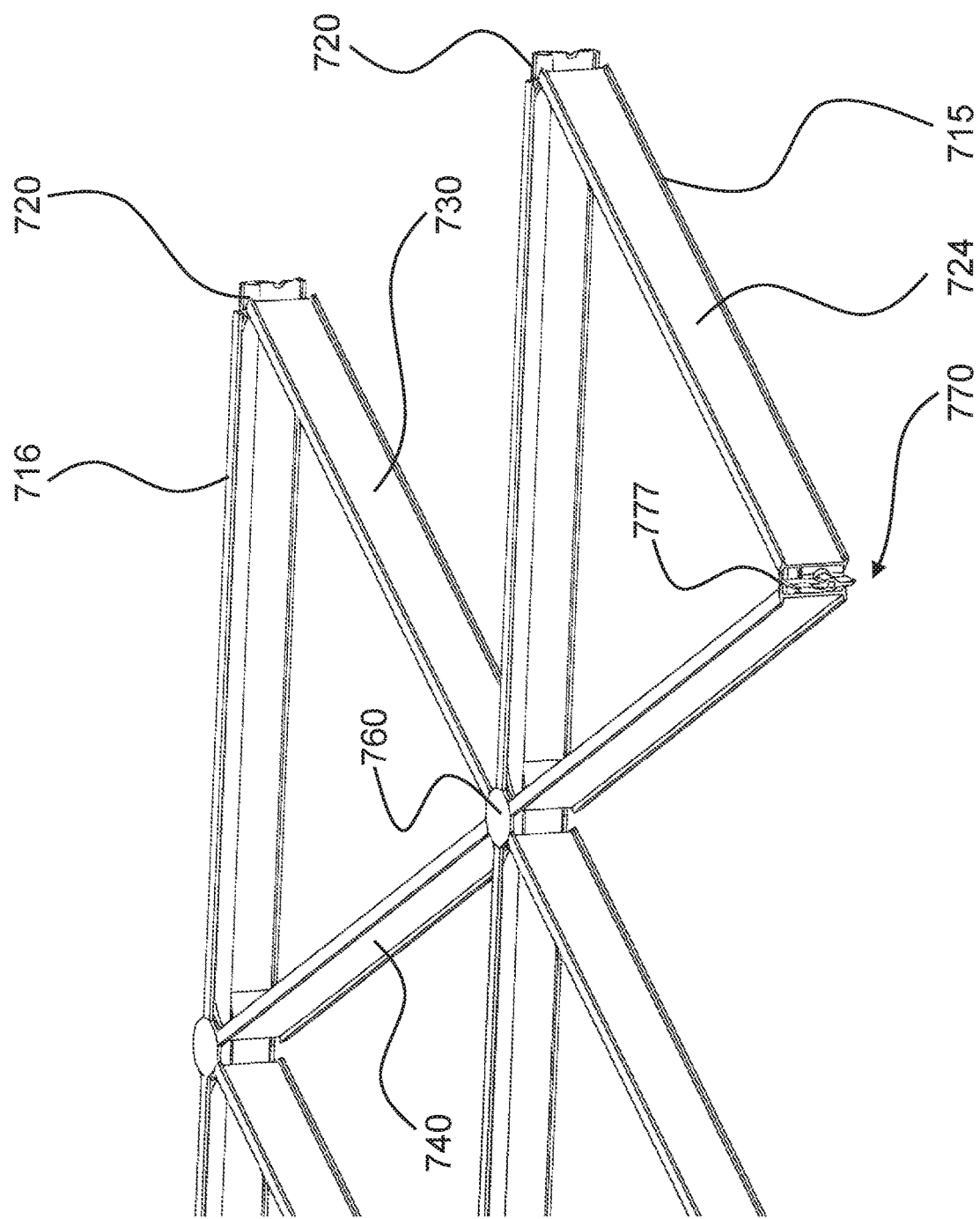
FIG. 45 shows a schematic perspective view of several elements of the irrigation system of FIG. 41 with a connector as shown in FIG. 48.
Figure 48:
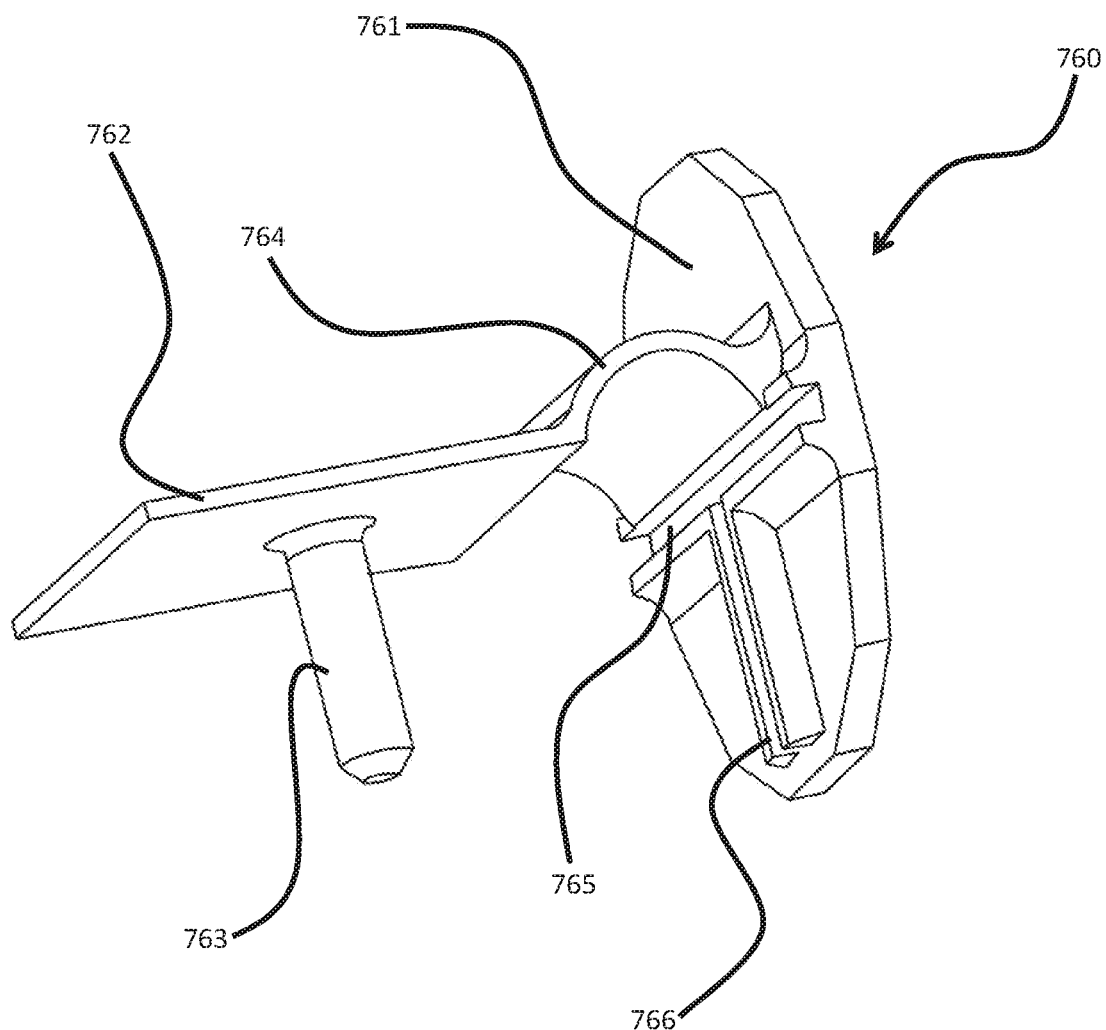
FIG. 48 shows a schematic perspective view of the connector as shown in FIG. 45 to 47.

FIG. 45 shows a schematic perspective view of several irrigation system elements 700 of the irrigation system of FIG. 41 with a connector 760 as shown in FIG. 48. The fluid conduit 720 is provided at the two parallel wall lines, wherein the structure elements 730 and 740 provide the necessary support. The above mentioned connector elements 770 are connected at the junction point with connector 760.

Figure 47:
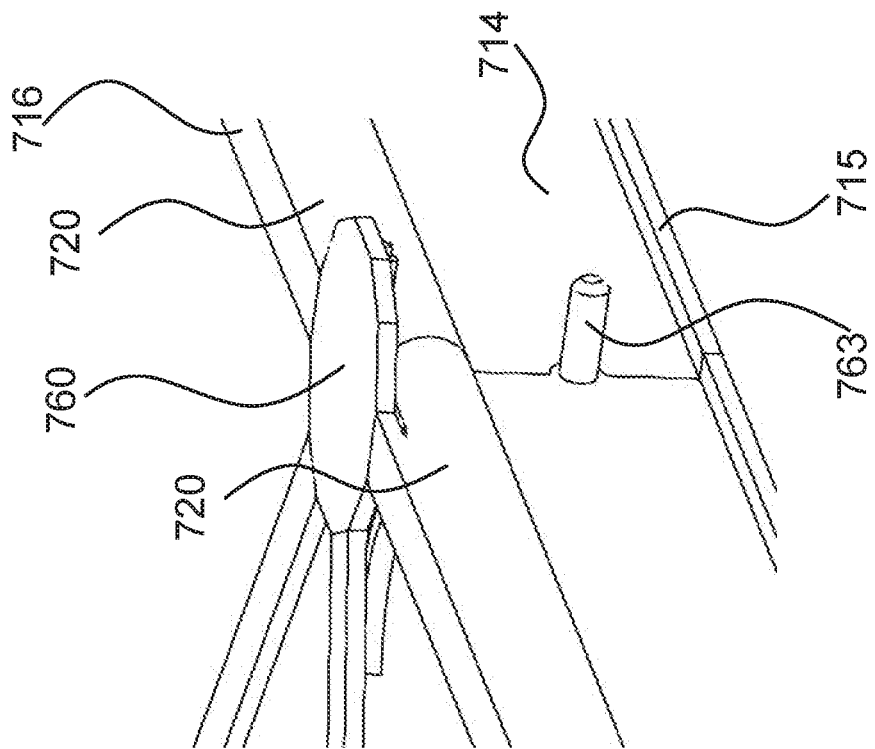
FIG. 47 shows a different schematic perspective view of FIG. 46 with the fluid connector parts joining beneath the connector.
Figure 46:
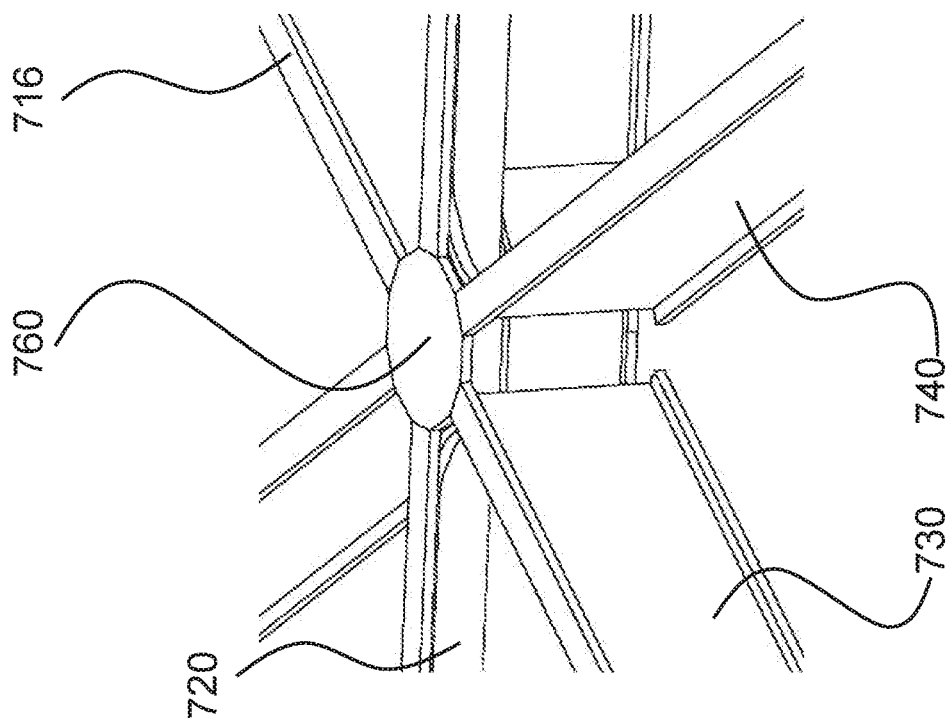
FIG. 46 shows a schematic perspective view of a corner connection between several elements of the irrigation system of FIG. 41 with a central fluid conduit line.

FIG. 46 shows a schematic perspective view of a corner connection 760 between several irrigation system elements 700 of the irrigation system of FIG. 41 with a central fluid conduit line 720. FIG. 47 shows a different schematic perspective view of FIG. 46 with the fluid connector 720 parts joining beneath the connector 760 and the twelve-corner cover plate extending until the cover plates 716 against which it abuts. It can be seen that the two side walls 714 are joining at the half-sided reception 768, wherein pin 763 of connector 760 is lodged through 778 of the extension 772. The two adjacent fluid connector 720 can comprise an inner gasket 500 as described above to allow for a higher leak tightness. It is also possible to provide the wall 714 and cover plate 716 with intermediate support rings 314 as shown in FIGS. 25 and 26 to accommodate a fluid conduit as additional pipe element.

FIG. 48 shows a schematic perspective view of the connector 760 as shown in FIG. 45 to 47. It comprises a cover plate 761 having a regular edge with twelve sections from which six are intended to be engaged by the cover plates of the six cover plates 716 of the six walls joining at such a corner, if all triangles are installed. Below the cover ground plate 761 are provided two grooves 765 and 766 provided in a T shape to accommodate the related edges 775 and 776 as described above. Then, the elements of FIG. 43 and FIG. 44 abut at this place with the front elements and the fluid conduit 720 is touching the adjacent fluid conduit 720 guided by the half spherical bulge 764 followed by the vertically oriented connector plate 764 being oriented in parallel to the groove 765. From this plate 762 extends perpendicular and centered below the groove 766 the pin 763 at a height allowing to traverse the hole 778, thus securing the triangle connection at this point.

Figure 51:
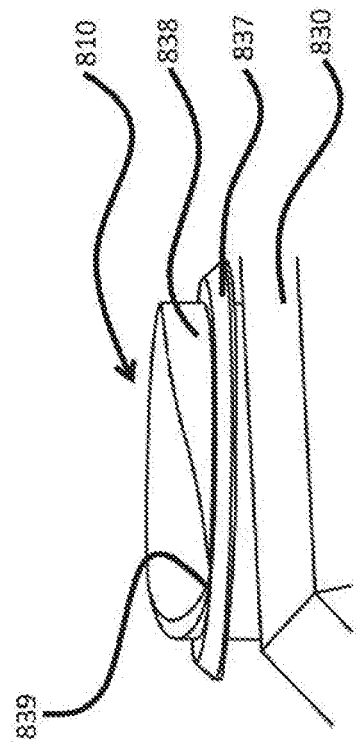
FIG. 51 shows a schematic perspective detail view of the spout of FIG. 49.
Figure 50:
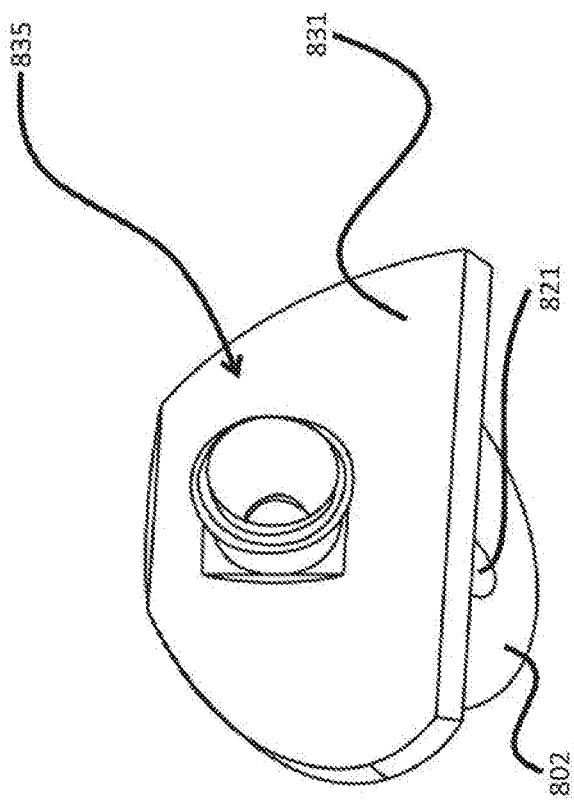
FIG. 50 shows a schematic perspective view of the spout of FIG. 49.
Figure 49:
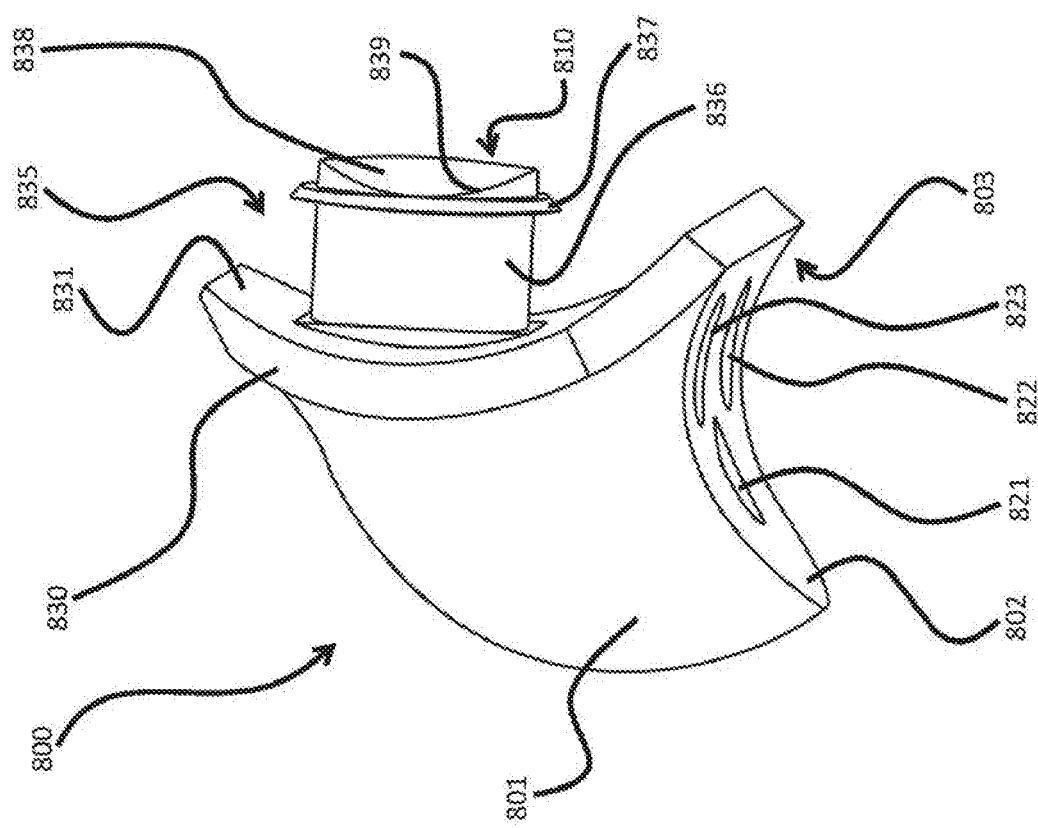
FIG. 49 shows a schematic near side view of a spout attachable to a fluid conduit according to any of the embodiments of the fluid system element.

FIG. 49 shows a schematic near side view of a spout 800 attachable to a fluid conduit 720, 130, 230 according to any of the embodiments of the fluid system element 100, 200 or 700. FIG. 50 shows a schematic perspective view of spout 800 of FIG. 49; and FIG. 51 shows a schematic perspective detail view of spout 800 of FIG. 49.

Spout 800 comprises a nose 801, an underside 802, a rounded lower surface 803 as well as three outlets 821, 822 and 823 as spout 600 above. The difference between the two spouts 600 and 800 resides in the fact that spout 600 is provided integrally with a fluid conduit 130, whereas spout 800 is an additional element to be attached to a fluid conduit which has to have complementary openings for the connector 835 attached integrally at the backside of the inner surface 831 of the fluid conduit contact wall 830. The fluid conduit contact wall 830 is a curved wall wherein the curvature of the inner surface 831 is complementary to the outer surface of the fluid conduit 130, 230, 720 surface.

The connector 835 attached integrally at the spout 800 body has a shaft 836 with an inner opening 810 allowing for a pipe water distribution to outlets 821, 822 and 823 via flow pipes 631, 632 and 633 for the spout 600 according to FIG. 30 to FIG. 32. Shaft 836 is followed by a resilient flange 837 to be lodged inside of the fluid conduit wall. Therefore, flange 837 has a tapering outside surface and a perpendicular step towards the shaft 836. Beyond the flange 837 is provided a short shaft continuation 838 inside the conduit which has a counter flow directed recess 839. In other words, the shaft continuation 838 wall comprises a higher portion extending inside the lumen of the water conduit and a lower cut-out or recess 839. Said recess 839 is oriented against the direction of the fluid flow direction in the fluid conduit, that said fluid flow can easily flow beyond the recess covering an angle of about 90 to 135 degree and then rising between 90/135 to 180 degree to the height of the shaft continuation wall. On the opposite side of the inner mouth 810 of the outlet the flow is disturbed and diverted so that part of this flow is directed via said pipes to the outlets 821, 822 and 823.

LIST OF REFERENCE SIGNS

| | |
|---|---|
| 100 | irrigation system element |
| 100' | irrigation system element |
| 100" | irrigation system element |
| 100'" | irrigation system element |
| 101 | connection point |
| 102 | connection point |
| 110 | longitudinal frame element |
| 111 | intersection point |
| 112 | free end |
| 113 | free end |
| 114 | vertical wall |
| 115 | broadened base |
| 115' | broadened base |
| 116 | cover plate |
| 120 | transverse frame element |
| 122 | free end |
| 123 | free end |
| 124 | vertical wall |
| 125 | broadened base |
| 125' | broadened base |
| 126 | cover plate |
| 127 | web |
| 130 | fluid conduit |
| 131 | mouth nose |
| 132 | wall |
| 135 | inner lumen |
| 137 | inner shoulder |
| 138 | central fluid flow |
| 139 | turning fluid flow |
| 140 | locking profile |
| 141 | groove |
| 142 | undercut |
| 143 | socle |
| 150 | complementary locking profile |
| 200 | irrigation system element |
| 210 | longitudinal frame element |
| 212 | free end |
| 213 | free end |
| 214 | conduit holder |
| 215 | stabilizing web |
| 216 | transverse web |
| 217 | longitudinal web |
| 218 | radial web |
| 220 | transverse frame element |
| 225 | groove |
| 230 | fluid conduit |
| 231 | mouth |
| 237 | tapered abutment surface |
| 240 | locking profile |
| 241 | groove |
| 242 | undercut |
| 300 | spout |
| 250 | complementary locking profile |
| 300 | irrigation system element |
| 314 | holder ring |
| 324 | upper edge surface |
| 340 | locking profile |
| 341 | plate |
| 342 | button |
| 350 | complementary locking profile |
| 351 | plate |
| 352 | longitudinal hole |
| 400 | outer connector |
| 402 | central flange |
| 403 | conduit connector |
| 404 | recess |
| 405 | slit |
| 406 | upper half end surface |
| 407 | lower half curved surface |
| 408 | joint alignment cavity |
| 409 | inner central opening |
| 440 | bore |
| 450 | barbed rod |
| 451 | ridge |
| 500 | gasket |
| 501 | side cylinder |
| 502 | gasket ring |
| 503 | inner surface of the gasket |
| 504 | tapered inner edge |
| 505 | free end of gasket |
| 550 | media in stream |
| 555 | media out stream |
| 560 | restricted diameter stream |
| 565 | expanding diameter stream |
| 600 | spout |
| 601 | nose |
| 602 | lower surface |
| 603 | curved lower surface |
| 610 | inner mouth of outlet |
| 621 | central outlet |
| 622 | side outlet |
| 623 | side outlet |
| 625 | media deposition area |
| 631 | center flow pipe |
| 632 | side flow pipe |
| 633 | side flow pipe |
| 700 | irrigation system element |
| 705 | triangular space |
| 706 | open space |

-continued

| | |
|---|---|
| 710 | structure element |
| 711 | intersection |
| 714 | vertical wall |
| 715 | broadened base |
| 716 | cover plate |
| 720 | fluid conduit line |
| 724 | vertical wall |
| 731 | mouth |
| 730 | structural frame element |
| 740 | structural frame element |
| 750 | connector |
| 751 | male (cross) connector |
| 752 | female connector |
| 755 | transverse wall |
| 760 | connector |
| 761 | ground plate |
| 762 | vertical connector plate |
| 763 | pin |
| 764 | half spherical bulge |
| 765 | vertical extension groove (line) |
| 766 | vertical extension groove (wall) |
| 767 | triangular connection wall |
| 768 | half-sided reception |
| 770 | triangular connector |
| 771 | triangular connection wall |
| 772 | extension |
| 773 | pin reception bore |
| 774 | half spherical recess |
| 775 | upper wall edge |
| 776 | upper wall edge |
| 777 | triangular connection wall |
| 778 | hole |
| 779 | cylindrical wall extension |
| 800 | spout |
| 801 | nose |
| 802 | lower surface |
| 803 | curved lower surface |
| 810 | inner mouth of outlet |
| 821 | central outlet |
| 822 | side outlet |
| 823 | side outlet |
| 830 | conduit contact wall |
| 831 | inner surface |
| 835 | conduit connector |
| 836 | cylindrical shaft |
| 837 | resilient flange |
| 838 | shaft continuation in conduit |
| 839 | counter flow directed recess |

The invention claimed is:

1. A subterranean irrigation system (100, 200, 300, 700), having a plurality of fluid conduit (130; 230) for applying a liquid from a source to an area of ground, to which said liquid is to applied while avoiding interference with the above-ground use of such area, wherein the fluid conduits (130; 230; 730) are connected relative to one another, wherein the plurality of fluid conduits (130; 230; 720) comprise a plurality of outlets (600; 621, 622, 632; 800; 821, 822, 823) to effect the distribution of the liquid to the ground area, wherein the plurality of outlets (600;621, 622, 623; 800; 821, 822, 823) are provided at an underside (602, 802) of a nose-shaped spout attachment (600, 800), wherein the spout attachment (600; 800) is attached at the side in the upper half of the fluid conduit (130; 230; 720) and wherein the underside (602; 802) comprises a rounded surface starting tangentially from the outer diameter of the fluid conduit (130; 230; 720) and ends in the nose-shaped free end of the spout attachment (600; 800).

2. The system according to claim 1, wherein a fluid conduit (230) is positioned inside a web-based framework (210; 215), in that the framework comprises hinge connectors (342; 352) at both longitudinal free ends.

3. The system according to claim 2, wherein the conduit support structure (110; 114; 124; 714; 724) has a cover plate (116, 716) with a top surface, preferably having a width corresponding to the outer diameter of the fluid conduit (130; 230; 720) it covers.

4. The system according to claim 2, further comprising a plurality of parallel positioned fluid conduits (130; 230; 720) and a plurality of further plate-shaped support structures (120; 124; 730, 740; 724) positioned in an angle to the conduit support structure (110; 114) forming a grid with intersection points (111; 711), wherein the angle is chosen from the group of 60, 90 or 120 degree, forming a rectangular grid, a triangular grid and a hexagonal grid, respectively.

5. The system according to claim 2, wherein the plate-shaped conduit support structure (110; 114) is connected with a cover plate (116; 716) through conduit holding rings (314) and that the fluid conduits are pipes positioned as separate elements through the conduit holding rings (314) and preferably over a number of subterranean irrigation system elements.

6. The system according to claim 2, wherein complementary locking profiles (140, 150; 240, 250; 440, 450; 760, 770) are provided at every free end (112, 113) of the plate-shaped conduit support structure (110; 114) of the fluid conduits (130; 230; 720) and at every free end (122, 123) of the further plate-shaped support structures (120; 124).

7. The system according to claim 1, wherein the fluid conduits (130; 720) are positioned on the longitudinal edge of a plate shaped conduit structure (110; 114; 124; 714; 724).

8. The system according to claim 7, wherein the conduit support structure (110; 114; 124; 714; 724) comprises a broadened base (115; 125), preferably provided with a water retention groove (225).

9. The system according to claim 8, wherein the sideways extending spout (600; 800) providing a media deposition area (625) just below the spout (600; 800) for fluid being delivered through spout (600; 800) and to be further retained in the groove (225).

10. The system according to claim 1, wherein the fluid conduits (130, 230; 720) of adjacent subterranean irrigation system elements are connected via a connector (400; 760) positioned on the free ends of the fluid conduits (130; 230), wherein the connector (400) preferably comprises an inner recess (404; 764) and that, optionally, the fluid conduit (130; 230) comprises a nose (131) at its free end to be fitted inside the recess (404).

11. The system according to claim 1, wherein at the free ends of adjacent fluid conduits (130; 230, 720) are provided a gasket insert (500).

12. The system according to claim 1, wherein the free end of the underside (602; 802) is oriented horizontally or slightly curved downwards.

13. The system according to claim 1, wherein each spout attachment comprises three outlets (621, 622, 623; 821, 822, 823), a central outlet (621; 821) and two side outlets (622, 623; 822, 823) positioned farer away from the free end of the nose attachment (602) than the central outlet (621; 821).

14. The system according to claim 1, wherein each outlet comprises an internal pipe (630) in the nose attachment (600) converging to a single inner mouth (610; 810) of the spout, wherein the inner mouth is positioned in the upper half of the lumen of the fluid conduit (130; 230).

15. A spout attachment (800) for a system according to claim 1, wherein the spout attachment (800) is configured to be attached at the side in the upper half of the fluid conduit (130; 230; 720).

* * * * *